US010951912B2

(12) United States Patent
Chuang et al.

(10) Patent No.: US 10,951,912 B2
(45) Date of Patent: Mar. 16, 2021

(54) SYSTEMS AND METHODS FOR ADAPTIVE SELECTION OF WEIGHTS FOR VIDEO CODING

(71) Applicant: QUALCOMM Incorporated, San Diego, CA (US)

(72) Inventors: Hsiao-Chiang Chuang, San Diego, CA (US); Jianle Chen, San Diego, CA (US); Xiang Li, San Diego, CA (US); Kai Zhang, San Diego, CA (US); Done Bugdayci Sansli, Tampere (FI); Marta Karczewicz, San Diego, CA (US); Wei-Jung Chien, San Diego, CA (US); Yu-Chen Sun, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 63 days.

(21) Appl. No.: 15/713,112

(22) Filed: Sep. 22, 2017

(65) Prior Publication Data

US 2018/0098070 A1 Apr. 5, 2018

Related U.S. Application Data

(60) Provisional application No. 62/404,715, filed on Oct. 5, 2016.

(51) Int. Cl.
*H04N 19/52* (2014.01)
*H04N 19/44* (2014.01)
(Continued)

(52) U.S. Cl.
CPC .......... *H04N 19/52* (2014.11); *H04N 19/105* (2014.11); *H04N 19/11* (2014.11); *H04N 19/126* (2014.11);
(Continued)

(58) Field of Classification Search
CPC .... H04N 19/105; H04N 19/11; H04N 19/119; H04N 19/126; H04N 19/137;
(Continued)

(56) References Cited

U.S. PATENT DOCUMENTS 5,293,430 A 3/1994 Shiau et al.
5,313,296 A 5/1994 Ohki
(Continued)

FOREIGN PATENT DOCUMENTS

EP 1790168 A1 5/2007
EP 2154901 A1 2/2010
(Continued)

OTHER PUBLICATIONS

Fujibavashi A., et al., "TE12: Performance of Partition Based Illumination Compensation (PBIC)", 3rd JCT-VC Meeting, 94th MPEG Meeting, Oct. 7, 2010-Oct. 15, 2010, Guangzhou, (Joint Collaborative Team on Video Coding of ISO/IEC JTC1/SC29/WG11 and ITU-T SG.16), URL: http://wftp3.itu.int/av-arch/jctvc-site/, No. JCTVC-C041, Oct. 1, 2010 (Oct. 1, 2010), XP030007748.
(Continued)

*Primary Examiner* — Francis Geroleo
(74) *Attorney, Agent, or Firm* — Polsinelli LLP

(57) ABSTRACT

Techniques and systems are provided for processing video data. For example, a current block of a picture of the video data can be obtained for processing by an encoding device or a decoding device. A pre-defined set of weights for template matching based motion compensation are also obtained. A plurality of metrics associated with one or more spatially neighboring samples of the current block and one or more spatially neighboring samples of at least one reference frame are determined. A set of weights are selected from the pre-defined set of weights to use for the template matching based motion compensation. The set of weights is
(Continued)

determined based on the plurality of metrics. The template matching based motion compensation is performed for the current block using the selected set of weights.

24 Claims, 21 Drawing Sheets

(51) Int. Cl.
    *H04N 19/61*     (2014.01)
    *H04N 19/51*     (2014.01)
    *H04N 19/105*     (2014.01)
    *H04N 19/137*     (2014.01)
    *H04N 19/159*     (2014.01)
    *H04N 19/176*     (2014.01)
    *H04N 19/196*     (2014.01)
    *H04N 19/625*     (2014.01)
    *H04N 19/186*     (2014.01)
    *H04N 19/43*     (2014.01)
    *H04N 19/553*     (2014.01)
    *H04N 19/577*     (2014.01)
    *H04N 19/11*     (2014.01)
    *H04N 19/126*     (2014.01)
    *H04N 19/139*     (2014.01)
    *H04N 19/119*     (2014.01)

(52) U.S. Cl.
    CPC ......... *H04N 19/137* (2014.11); *H04N 19/139* (2014.11); *H04N 19/159* (2014.11); *H04N 19/176* (2014.11); *H04N 19/186* (2014.11); *H04N 19/198* (2014.11); *H04N 19/43* (2014.11); *H04N 19/44* (2014.11); *H04N 19/51* (2014.11); *H04N 19/553* (2014.11); *H04N 19/577* (2014.11); *H04N 19/61* (2014.11); *H04N 19/625* (2014.11); *H04N 19/119* (2014.11)

(58) Field of Classification Search
    CPC .. H04N 19/139; H04N 19/159; H04N 19/176; H04N 19/186; H04N 19/198; H04N 19/43; H04N 19/44; H04N 19/51; H04N 19/52; H04N 19/553; H04N 19/577; H04N 19/61; H04N 19/625
    See application file for complete search history.

(56) References Cited

U.S. PATENT DOCUMENTS

| | | | |
|---|---|---|---|
| 5,781,788 | A | 7/1998 | Woo et al. |
| 6,259,741 | B1 | 7/2001 | Chen et al. |
| 2001/0016078 | A1 | 8/2001 | Go |
| 2004/0005004 | A1 | 1/2004 | Demos |
| 2008/0304760 | A1 | 12/2008 | Lee et al. |
| 2011/0007803 | A1 | 1/2011 | Karczewicz et al. |
| 2011/0142132 | A1 | 6/2011 | Tourapis et al. |
| 2011/0170793 | A1 | 7/2011 | Sato et al. |
| 2011/0176614 | A1 | 7/2011 | Sato et al. |
| 2011/0176741 | A1 | 7/2011 | Sato et al. |
| 2011/0261886 | A1* | 10/2011 | Suzuki .................. H04N 19/56 375/240.16 |
| 2011/0280309 | A1 | 11/2011 | Francois et al. |
| 2013/0108184 | A1* | 5/2013 | Lee .......................... G06T 9/004 382/233 |
| 2013/0182768 | A1 | 7/2013 | Jeong et al. |
| 2014/0003522 | A1 | 1/2014 | Park et al. |
| 2014/0072041 | A1 | 3/2014 | Seregin et al. |
| 2014/0139627 | A1 | 5/2014 | Chen et al. |
| 2015/0350642 | A1 | 12/2015 | Park et al. |
| 2016/0134869 | A1 | 5/2016 | Ikai et al. |
| 2016/0150238 | A1 | 5/2016 | Park et al. |
| 2018/0098079 | A1 | 4/2018 | Chuang et al. |
| 2018/0098086 | A1 | 4/2018 | Chuang et al. |
| 2018/0255295 | A1 | 9/2018 | Lee et al. |
| 2019/0045183 | A1* | 2/2019 | Chen .................... H04N 19/176 |
| 2019/0166370 | A1 | 5/2019 | Xiu et al. |
| 2019/0230350 | A1* | 7/2019 | Chen .................... H04N 19/105 |

FOREIGN PATENT DOCUMENTS

| | | |
|---|---|---|
| EP | 2515542 A2 | 10/2012 |
| WO | 2011002809 A2 | 1/2011 |

OTHER PUBLICATIONS

International Search Report and Written Opinion—PCT/US2017/055189—ISA/EPO—dated Dec. 21, 2017.
Kamp M-S., "Decoder-Side Motion Vector Derivation for Hybrid Video Coding Zur Erlangung Des Akademischen Grades Eines Doktors Der Ingenieurwissenschaften Genehmigte Dissertation", RWTH Aachen Series on Multimedia and Communications Engineering, Oct. 11, 2011, XP055361986, ISBN: 978-3-8440-0615-5, Retrieved from the Internet: URL:http://www.ient.rwth-aachen.de/services/bib2web/pdf/Ka11.pdf [retrieved on Apr. 5, 2017], 201 pages.
Lee G.G.., et al., "AHG 10: Complexity Assessment on Illumination Compensation (IC)", 7th JCT-3V Meeting; Jan. 11, 2014-Jan. 17, 2014; San Jose; (The Joint Collaborative Team on 3D Video Coding Extension Development of ISO/IEC JTC1/SC29/WG11 and ITU-T SG.16); URL: http://phenix.int-evry.fr/jct2/,,No. JCT3V-G0114-v7, Jan. 14, 2014, XP030131886, 12 pages.
Lee J. Y., et al., "Simplification of Adaptive luminance Compensation in 3D-AVC", 4th JCT-3V Meeting; Incheon; (The Joint Collaborative Team on 3D Video Coding Extension Development of ISO/IEC JTC1/SC29/WG11 and ITU-T SG.16); URL: http://phenix.int-evry.fr/jct2/,,No. JCT3V-D0116, Apr. 15, 2013, XP030130780, 3 pages.
Seo C-W., et al., "Pixel Based Illumination Compensation for Inter Prediction in HEVC", Electronics Let, IEE Stevenage, GB, vol. 47, No. 23, Nov. 10, 2011, pp. 1278-1280, XP006040392, ISSN: 0013-5194, DOI: 10.1049/EL.2011.2524.
Tech G., et al., "3D-HEVC Test Model 2," Joint Collaborative Team on 3D Video Coding Extension Development of ITU-T SG 16 WP 3 and ISO/IEC JTC 1/SC 29/WG 11, Document: JCT3V-B1005_d0, 2nd Meeting: Shanghai, CN, Oct. 13-19, 2012, 118 pages, XP030130414.
Yin P., et al., "Localized Weighted Prediction for Video Coding", IEEE International Symposium on Circuits and Systems (ISCAS), May 23, 2005, pp. 4365-4368, vol. 5, IEEE, XP010816640, DoI: 10.1109/ISCAS.2005.1465598, ISBN: 978-0-7803-8834-5.
Zhang X., et al., "3D-CE2: Complexity Reduction on Illumination Compensation for 3D-HEVC", 11th JCT-3V Meeting; Feb. 12, 2015-Feb. 18, 2015; Geneva; (The Joint Collaborative Team on 3D Video Coding Extension Development of ISO/IEC JTC1/SC29/WG11 and ITU-T SG.16); URL: http://phenix.int-evry.fr/jct2/,,No. JCT3V-K0032, Feb. 5, 2015, XP030132695, 7 pages.

\* cited by examiner

Reference block

Current CU

SYSTEMS AND METHODS FOR ADAPTIVE SELECTION OF WEIGHTS FOR VIDEO CODING

CROSS-REFERENCE TO RELATED APPLICATIONS

This application claims the benefit of U.S. Provisional Application No. 62/404,715, filed Oct. 5, 2016, which is hereby incorporated by reference, in its entirety and for all purposes.

FIELD

This application is related to video coding and compression. More specifically, this application relates to systems and methods of adaptively selecting weights for video coding.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include high-efficiency video coding (HEVC), advanced video coding (AVC), moving picture experts group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

BRIEF SUMMARY

In some implementations, techniques and systems are described herein for adaptive selection of weights from a pre-defined set of weights for video coding. For example, a template-based solution can be used to search for one more optimal weights out of the pre-defined set of weights without having to signal the choice of weights to the decoder. Such systems and methods can be used for any matching based motion prediction or compensation that utilizes weights in the prediction process.

According to at least one example, a method of processing video data is provided. The method comprises obtaining a current block of a picture of the video data, and obtaining a pre-defined set of weights for template matching based motion compensation. The method further comprises determining a plurality of metrics associated with one or more spatially neighboring samples of the current block and one or more spatially neighboring samples of at least one reference frame. The method further comprises selecting a set of weights from the pre-defined set of weights to use for the template matching based motion compensation. The set of weights is determined based on the plurality of metrics. The method further comprises performing the template matching based motion compensation for the current block using the selected set of weights.

In another example, an apparatus for processing video data is provided that includes a memory configured to store video data and a processor. The processor is configured to and can obtaining a current block of a picture of the video data, and obtain a pre-defined set of weights for template matching based motion compensation. The processor is further configured to and can determine a plurality of metrics associated with one or more spatially neighboring samples of the current block and one or more spatially neighboring samples of at least one reference frame. The processor is further configured to and can select a set of weights from the pre-defined set of weights to use for the template matching based motion compensation. The set of weights is determined based on the plurality of metrics. The processor is further configured to and can perform the template matching based motion compensation for the current block using the selected set of weights.

In another example, a non-transitory computer-readable medium is provided having stored thereon instructions that, when executed by one or more processors, cause the one or more processor to: obtain a current block of a picture of the video data; obtain a pre-defined set of weights for template matching based motion compensation; determine a plurality of metrics associated with one or more spatially neighboring samples of the current block and one or more spatially neighboring samples of at least one reference frame; select a set of weights from the pre-defined set of weights to use for the template matching based motion compensation, wherein the set of weights is determined based on the plurality of metrics; and perform the template matching based motion compensation for the current block using the selected set of weights.

In another example, an apparatus for processing video data is provided. The apparatus includes means for obtaining a current block of a picture of the video data, and means for obtaining a pre-defined set of weights for template matching based motion compensation. The apparatus further includes means for determining a plurality of metrics associated with one or more spatially neighboring samples of the current block and one or more spatially neighboring samples of at least one reference frame. The apparatus further includes means for selecting a set of weights from the pre-defined set of weights to use for the template matching based motion compensation. The set of weights is determined based on the plurality of metrics. The apparatus further includes means for performing the template matching based motion compensation for the current block using the selected set of weights.

In some aspects, the predefined set of weights includes at least a first set of weights and a second set of weights. In such aspects, determining the plurality of metrics comprises: determining a first metric by applying the first set of weights to the one or more spatially neighboring samples of the at least one reference frame; and determining a second metric by applying the second set of weights to the one or more spatially neighboring samples of the at least one reference frame.

In some aspects, the selected set of weights includes the first set of weights. In such aspects, selecting the set of weights based on the plurality of metrics comprises: comparing the first metric and the second metric; determining the first metric is smaller than the second metric; and selecting the first set of weights based on the first metric being smaller than the second metric, wherein the first set of weights results in a smallest metric among the pre-defined set of weights for template matching based motion compensation.

In some aspects, determining the plurality of metrics comprises determining a sum of absolute differences between the one or more spatially neighboring samples of the current block and the one or more spatially neighboring samples of the at least one reference frame.

In some aspects, determining the plurality of metrics comprises determining a sum of absolute transformed differences between the one or more spatially neighboring samples of the current block and the one or more spatially neighboring samples of the at least one reference frame.

In some aspects, determining the plurality of metrics comprises determining a sum of squared errors of prediction between the one or more spatially neighboring samples of the current block and the one or more spatially neighboring samples of the at least one reference frame.

In some aspects, no weighting parameter is signaled with the video data.

In some aspects, the template matching based motion compensation includes local illumination compensation (LIC). In some aspects, the template matching based motion compensation includes weighted prediction (WP).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
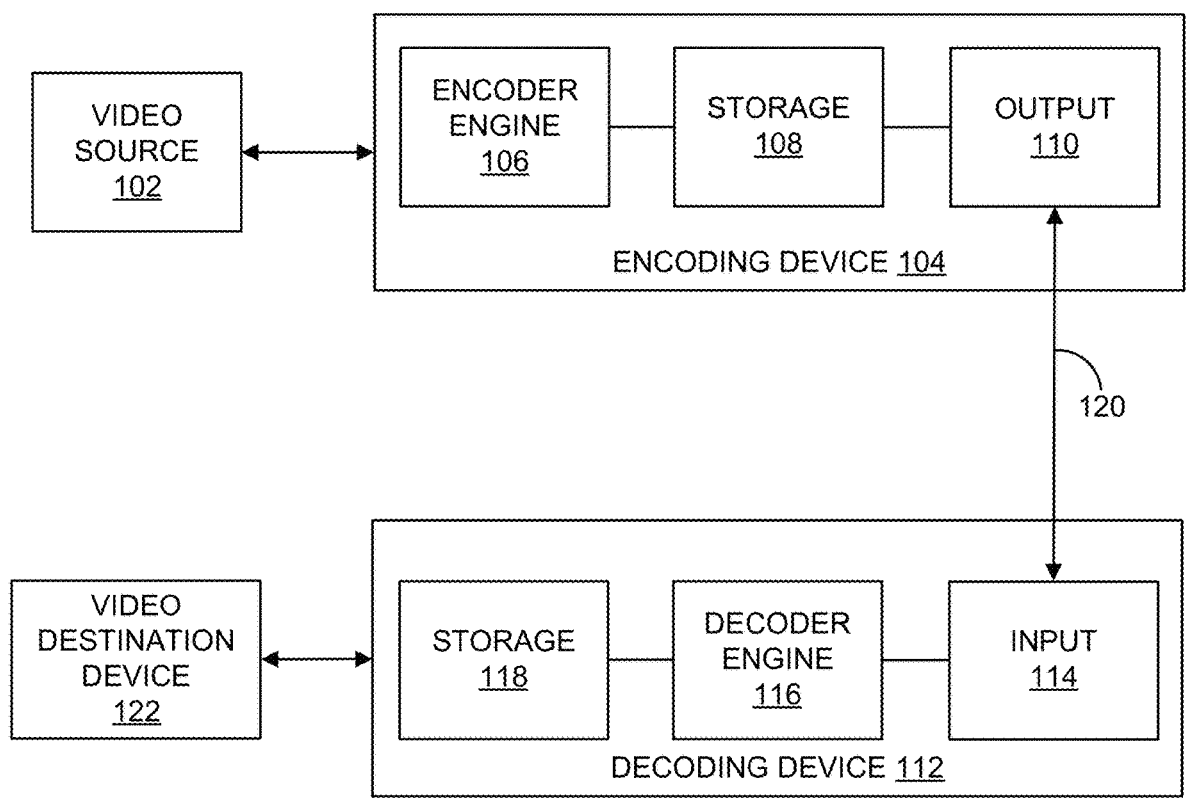
FIG. 1 is a block diagram illustrating an example of an encoding device and a decoding device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data, and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill. Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the pixel values in the block being encoded and the predicted block. The prediction error can also be referred to as the residual. The video encoder may also apply a transform to the prediction error (e.g., a discrete cosine transform (DCT) or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy code syntax elements, thereby further reducing the number of bits needed for their representation.

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

In some examples, one or more systems and methods of processing video data are directed to deriving or estimating illumination compensation (IC) parameters in block based video coding. In some instances, a video encoder and/or a video decoder can perform local illumination compensation (LIC) (or illumination compensation (IC)) to efficiently code variations in illumination (e.g., brightness) between one or more pictures. The video encoder and/or the video decoder can determine one or more IC parameters (e.g., an offset, one or more scaling factors, a shift number, or other suitable IC parameters) for the coding block or coding unit being encoded or decoded. The IC parameters can be determined based on samples of multiple reference blocks, samples of one or more neighboring blocks of the current block, and/or other information. The video decoder can utilize the IC parameters and/or other data to construct predictive data for decoding the current block.

In some examples, one or more systems and methods of processing video data are directed to adaptively determining the size of one or more templates to use for LIC. For example, the number of rows and/or column of pixels in a template used to derive one or more LIC parameters for a current block can vary depending on a parameter of the current block. The parameter can include the block size (e.g., the width, the height, or the width and height of the block, or other suitable measure of size), a chroma format of the block (e.g., 4:2:0 format, 4:2:2 format, 4:4:4 format, or other suitable chroma format), or other parameter that can be used to determine the template size.

In some examples, one or more systems and methods of processing video data are directed to adaptive selection of weights from a pre-defined set of weights. For example, a template-based solution can be used to search for one more optimal weights out of the pre-defined set of weights without having to signal the choice of weights to the decoder. Such systems and methods can be used for any matching based motion prediction or compensation that utilizes weights in the prediction process. For example, such systems and methods can be used for any bi-predicted block where two motion vectors pointing to two logically separate pictures are considered. In such examples, the weights can be referred to as a pair of weighting factors for both reference pictures (e.g., ref0 and ref1) with a sum equal to one. Examples of matching based motion prediction or compensation techniques that such systems and methods can be used for include LIC, weighted prediction (WP), or any other suitable techniques that utilize weights in the prediction process.

The techniques described herein can be applied to any of the existing video codecs (e.g., High Efficiency Video Coding (HEVC), Advanced Video Coding (AVC), or other suitable existing video codec), or can be an efficient coding tool for any future video coding standards, such as, for example, the joint exploration model (JEM).

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). MPEG and ITU-T VCEG have also formed a joint exploration video team (JVET) to explore new coding tools for the next generation of video coding standard. The reference software is called JEM (joint exploration model).

Many embodiments described herein provide examples using the JEM model, the HEVC standard, and/or extensions thereof. However, the techniques and systems described herein may also be applicable to other coding standards, such as AVC, MPEG, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that is part of a video. The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

The encoding device 104 may then perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 of the decoding device 112 receives the encoded video bitstream data and may provide the video bitstream data to the decoder engine 116, or to storage 118 for later use by the decoder engine 116. The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 19. An example of specific details of the decoding device 112 is described below with reference to FIG. 20.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As described above, for each block, a set of motion information (also referred to herein as motion parameters) can be available. A set of motion information contains motion information for forward and backward prediction directions. The forward and backward prediction directions are two prediction directions of a bi-directional prediction mode, in which case the terms "forward" and "backward" do not necessarily have a geometrical meaning. Instead, "forward" and "backward" correspond to reference picture list 0 (RefPicList0) and reference picture list 1 (RefPicList1) of a current picture. In some examples, when only one reference picture list is available for a picture or slice, only RefPicList0 is available and the motion information of each block of a slice is always forward.

In some cases, a motion vector together with its reference index is used in coding processes (e.g., motion compensation). Such a motion vector with the associated reference index is denoted as a uni-predictive set of motion information. For each prediction direction, the motion information can contain a reference index and a motion vector. In some cases, for simplicity, a motion vector itself may be referred in a way that it is assumed that it has an associated reference index. A reference index is used to identify a reference picture in the current reference picture list (RefPicList0 or RefPicList1). A motion vector has a horizontal and a vertical component that provide an offset from the coordinate position in the current picture to the coordinates in the reference picture identified by the reference index. For example, a reference index can indicate a particular reference picture that should be used for a block in a current picture, and the motion vector can indicate where in the reference picture the best-matched block (the block that best matches the current block) is in the reference picture.

A picture order count (POC) can be used in video coding standards to identify a display order of a picture. Although there are cases for which two pictures within one coded video sequence may have the same POC value, it typically does not happen within a coded video sequence. When multiple coded video sequences are present in a bitstream, pictures with a same value of POC may be closer to each other in terms of decoding order. POC values of pictures can be used for reference picture list construction, derivation of reference picture set as in HEVC, and motion vector scaling.

In H.264/AVC, each inter macroblock (MB) may be partitioned in four different ways, including: one 16×16 MB partition; two 16×8 MB partitions; two 8×16 MB partitions; and four 8×8 MB partitions. Different MB partitions in one MB may have different reference index values for each direction (RefPicList0 or RefPicList1). In some cases, when an MB is not partitioned into four 8×8 MB partitions, it can have only one motion vector for each MB partition in each direction. In some cases, when an MB is partitioned into four 8×8 MB partitions, each 8×8 MB partition can be further partitioned into sub-blocks, in which case each sub-block can have a different motion vector in each direction. In some examples, there are four different ways to get sub-blocks from an 8×8 MB partition, including: one 8×8 sub-block; two 8×4 sub-blocks; two 4×8 sub-blocks; and four 4×4 sub-blocks. Each sub-block can have a different motion vector in each direction. Therefore, a motion vector is present in a level equal to higher than sub-block.

In AVC, a temporal direct mode can be enabled at either the MB level or the MB partition level for skip and/or direct mode in B slices. For each MB partition, the motion vectors of the block co-located with the current MB partition in the RefPicList1[0] of the current block are used to derive the motion vectors. Each motion vector in the co-located block is scaled based on POC distances.

A spatial direct mode can also be performed in AVC. For example, in AVC, a direct mode can also predict motion information from the spatial neighbors.

In HEVC, the largest coding unit in a slice is called a coding tree block (CTB). A CTB contains a quad-tree, the nodes of which are coding units. The size of a CTB can range from 16×16 to 64×64 in the HEVC main profile. In some cases, 8×8 CTB sizes can be supported. A coding unit (CU) could be the same size of a CTB and as small as 8×8. In some cases, each coding unit is coded with one mode. When a CU is inter-coded, the CU may be further partitioned into 2 or 4 prediction units (PUs), or may become just one PU when further partition does not apply. When two PUs are present in one CU, they can be half size rectangles or two rectangles with ¼ or ¾ size of the CU.

When the CU is inter-coded, one set of motion information is present for each PU. In addition, each PU is coded with a unique inter-prediction mode to derive the set of motion information.

For motion prediction in HEVC, there are two inter-prediction modes, including merge mode and advanced motion vector prediction (AMVP) mode for a prediction unit (PU). Skip is considered as a special case of merge. In either AMVP or merge mode, a motion vector (MV) candidate list is maintained for multiple motion vector predictors. The motion vector(s), as well as reference indices in the merge mode, of the current PU are generated by taking one candidate from the MV candidate list.

In some examples, the MV candidate list contains up to five candidates for the merge mode and two candidates for the AMVP mode. In other examples, different numbers of candidates can be included in a MV candidate list for merge mode and/or AMVP mode. A merge candidate may contain a set of motion information. For example, a set of motion information can include motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode, for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined.

As can be seen above, a merge candidate corresponds to a full set of motion information, while an AMVP candidate contains just one motion vector for a specific prediction direction and reference index. The candidates for both modes are derived similarly from the same spatial and temporal neighboring blocks.

In some examples, merge mode allows an inter-predicted PU to inherit the same motion vector or vectors, prediction direction, and reference picture index or indices from an inter-predicted PU that includes a motion data position selected from a group of spatially neighboring motion data positions and one of two temporally co-located motion data positions. For AMVP mode, motion vector or vectors of a PU can be predicatively coded relative to one or more motion vector predictors (MVPs) from an AMVP candidate list constructed by an encoder. In some instances, for single direction inter-prediction of a PU, the encoder can generate a single AMVP candidate list. In some instances, for bi-directional prediction of a PU, the encoder can generate two AMVP candidate lists, one using motion data of spatial and temporal neighboring PUs from the forward prediction direction and one using motion data of spatial and temporal neighboring PUs from the backward prediction direction.

Figure 2B:
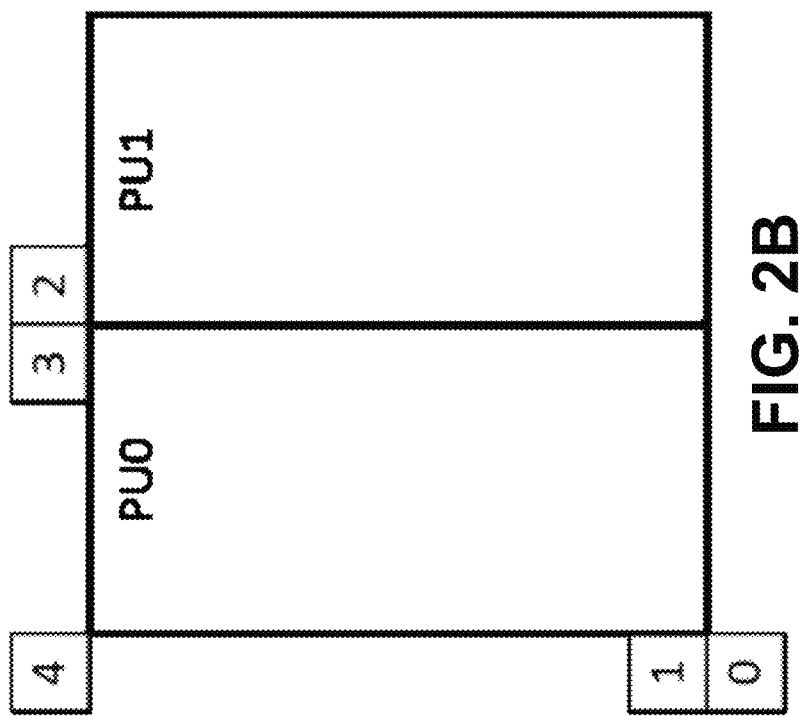
FIG. 2B is a conceptual diagram illustrating example spatial neighboring motion vector candidates for an advanced motion vector prediction (AMVP) mode, in accordance with some examples.
Figure 2A:
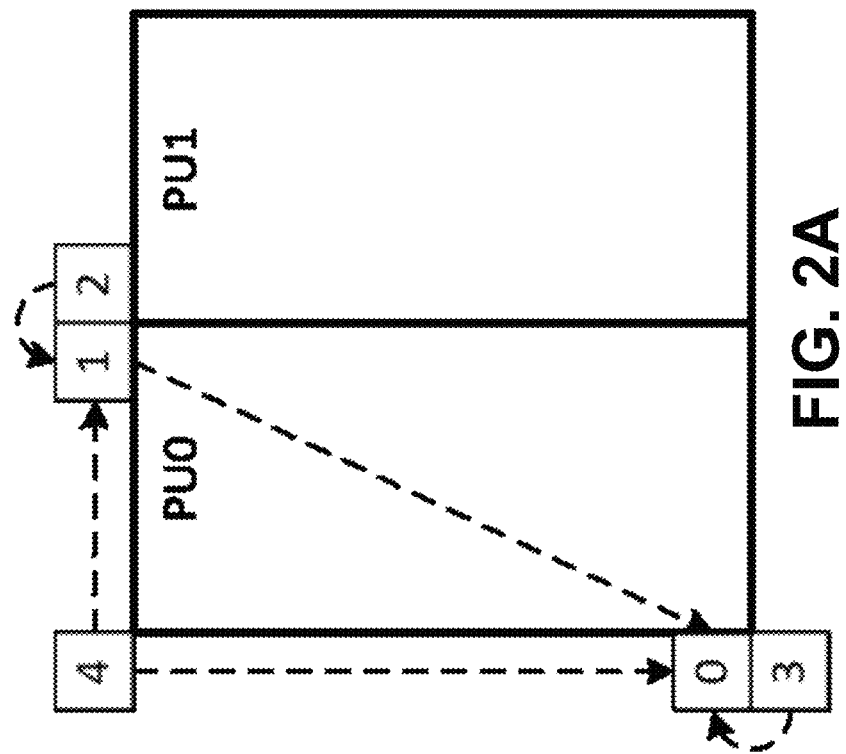
FIG. 2A is a conceptual diagram illustrating example spatial neighboring motion vector candidates for a merge mode, in accordance with some examples.

The candidates for both modes can be derived from spatial and/or temporal neighboring blocks. For example, FIG. 2A and FIG. 2B include conceptual diagrams illustrating spatial neighboring candidates in HEVC. FIG. 2A illustrates spatial neighboring motion vector (MV) candidates for merge mode. FIG. 2B illustrates spatial neighboring motion vector (MV) candidates for AMVP mode. Spatial MV candidates are derived from the neighboring blocks for a specific PU (PU0), although the methods generating the candidates from the blocks differ for merge and AMVP modes.

In merge mode, the encoder can form a merging candidate list by considering merging candidates from various motion data positions. For example, as shown in FIG. 2A, up to four spatial MV candidates can be derived with respect spatially neighboring motion data positions shown with numbers 0-4 in FIG. 2A. The MV candidates can be ordered in the merging candidate list in the order shown by the numbers 0-4. For example, the positions and order can include: left position (0), above position (1), above right position (2), below left position (3), and above left position (4).

In AVMP mode shown in FIG. 2B, the neighboring blocks are divided into two groups: left group including the blocks 0 and 1, and above group including the blocks 2, 3, and 4. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate, thus the temporal distance differences can be compensated.

Figure 3A:
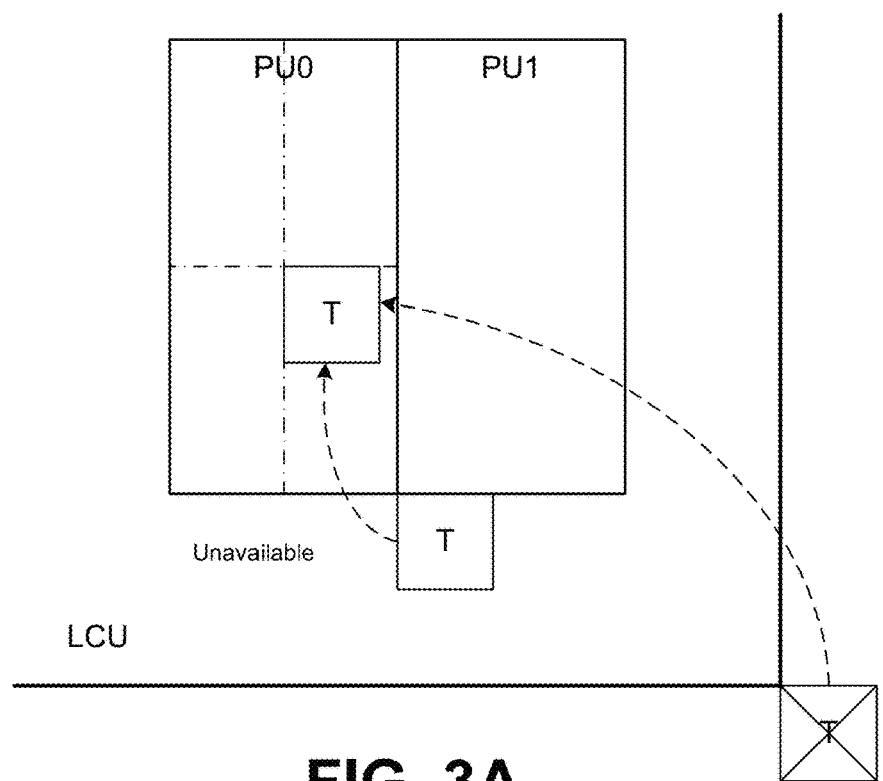
FIG. 3A is a conceptual diagram illustrating an example temporal motion vector predictor (TMVP) candidate, in accordance with some examples.
Figure 3B:
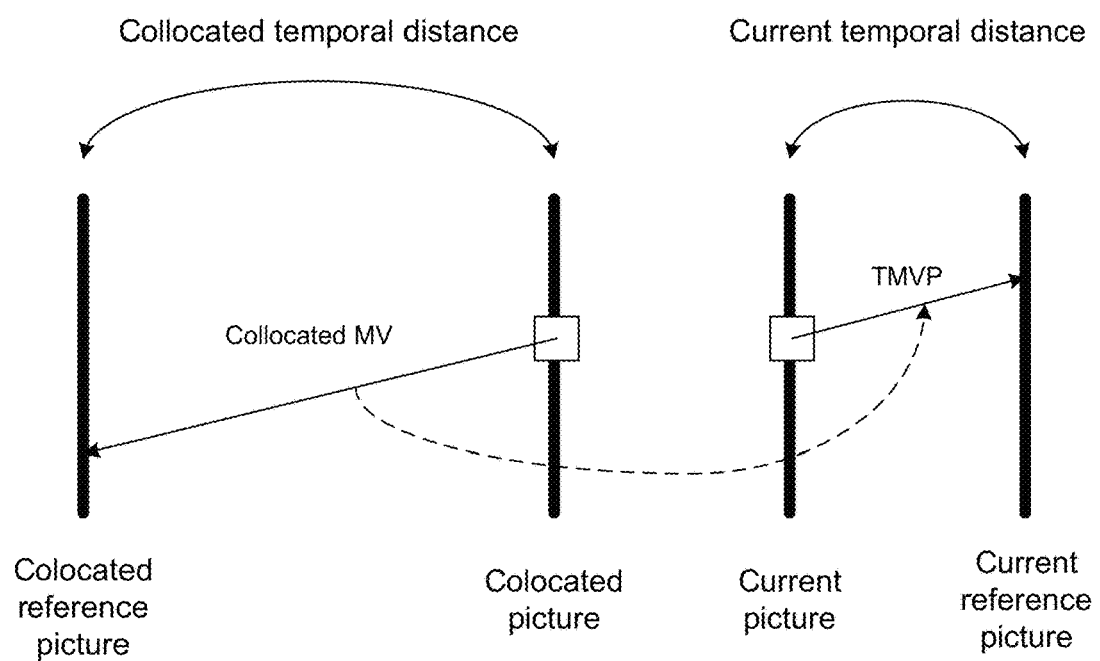
FIG. 3B is a conceptual diagram illustrating an example of motion vector scaling, in accordance with some examples.

FIG. 3A and FIG. 3B include conceptual diagrams illustrating temporal motion vector prediction in HEVC. A temporal motion vector predictor (TMVP) candidate, if enabled and available, is added into a MV candidate list after spatial motion vector candidates. The process of motion vector derivation for a TMVP candidate is the same for both merge and AMVP modes. In some instances, however, the target reference index for the TMVP candidate in the merge mode can be set to zero or can be derived from that of the neighboring blocks.

The primary block location for TMVP candidate derivation is the bottom right block outside of the collocated PU, as shown in FIG. 3A as a block "T", to compensate for the bias to the above and left blocks used to generate spatial neighboring candidates. However, if that block is located outside of the current CTB (or LCU) row or motion information is not available, the block is substituted with a center block of the PU. A motion vector for a TMVP candidate is derived from the co-located PU of the co-located picture, indicated in the slice level. Similar to temporal direct mode in AVC, a motion vector of the TMVP candidate may be subject to motion vector scaling, which is performed to compensate for distance differences.

Other aspects of motion prediction are covered in the HEVC standard. For example, several other aspects of merge and AMVP modes are covered. One aspect includes motion vector scaling. With respect to motion vector scaling, it can be assumed that the value of motion vectors is proportional to the distance of pictures in the presentation time. A motion vector associates two pictures—the reference picture and the picture containing the motion vector (namely the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore, a new distance (based on POC) is calculated. And, the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Another aspect of motion prediction includes artificial motion vector candidate generation. For example, if a motion vector candidate list is not complete, artificial motion vector candidates are generated and inserted at the end of the list until all candidates are obtained. In merge mode, there are two types of artificial MV candidates: combined candidate derived only for B-slices; and zero candidates used only for AMVP if the first type does not provide enough artificial candidates. For each pair of candidates that are already in the candidate list and that have necessary motion information, bi-directional combined motion vector candidates are derived by a combination of the motion vector of the first candidate referring to a picture in the list 0 and the motion vector of a second candidate referring to a picture in the list 1.

Another aspect of merge and AMVP modes includes a pruning process for candidate insertion. For example, candidates from different blocks may happen to be the same, which decreases the efficiency of a merge and/or AMVP candidate list. A pruning process can be applied to solve this problem. The pruning process compares one candidate against the others in the current candidate list to avoid inserting identical candidate in certain extent. To reduce the complexity, only limited numbers of pruning process is applied instead of comparing each potential one with all the other existing ones.

There are various related motion-prediction technologies. One prediction technology is local illumination compensation (LIC). Illumination compensation has been proposed for HEVC. For example, in JCTVC-0041, Partition Based Illumination Compensation (PBIC) was proposed. Different from weighted prediction (WP), which enables and/or disables WP, and signals WP parameters at the slice level (as described below), PBIC enables and/or disables illumination compensation (IC) and signals IC parameters at the prediction unit (PU) level to handle local illumination variation. In JVET-B0023, the block-based LIC is extended to the CU, similar to PU in HEVC, CU becomes the basic unit which carries the motion information in the QTBT structure.

Similar to Weighted Prediction (WP), which is described in more detail below, a scaling factor (also denoted by a) and an offset (also denoted by b) is used in IC, and the shift number is fixed to be 6. An IC flag is coded for each PU to indicate whether IC applies for current PU or not. If IC applies for the PU, a set of IC parameters (e.g., a and b) are signaled to the decoder and is used for motion compensation. In some examples, to save bits spent on IC parameters, the chroma component shares the scaling factors with luma component and a fixed offset 128 is used.

In 3D-HEVC, IC is enabled for inter-view prediction. Different from WP and PBIC, which signals IC parameters explicitly, it derives IC parameters based on neighboring samples of current CU and neighboring samples of reference block. IC applies to 2N×2N partition mode only. For AMVP mode, one IC flag is signaled for each CU that is predicted from an inter-view reference picture. For merge mode, to save bits, an IC flag is signaled only when the merge index of the PU is not equal to 0. In some cases, IC does not apply to CU that is only predicted from temporal reference pictures.

With respect to derivation of IC parameters, the linear IC model used in inter-view prediction is shown in Equation (1):

$$p(i,j)=a*r(i+dv_x,j+dv_y)+b, \text{ where } (i,j) \in PU_c \quad \text{Equation (1)}$$

Here, $PU_c$ is the current PU, (i, j) is the coordinate of pixels in $PU_c$, $(dv_x, dv_y)$ is the disparity vector of $PU_c$. p(i, j) is the prediction of $PU_c$, r is the PU's reference picture from the neighboring view, and a and b are parameters of the linear IC model.

Figure 4B:
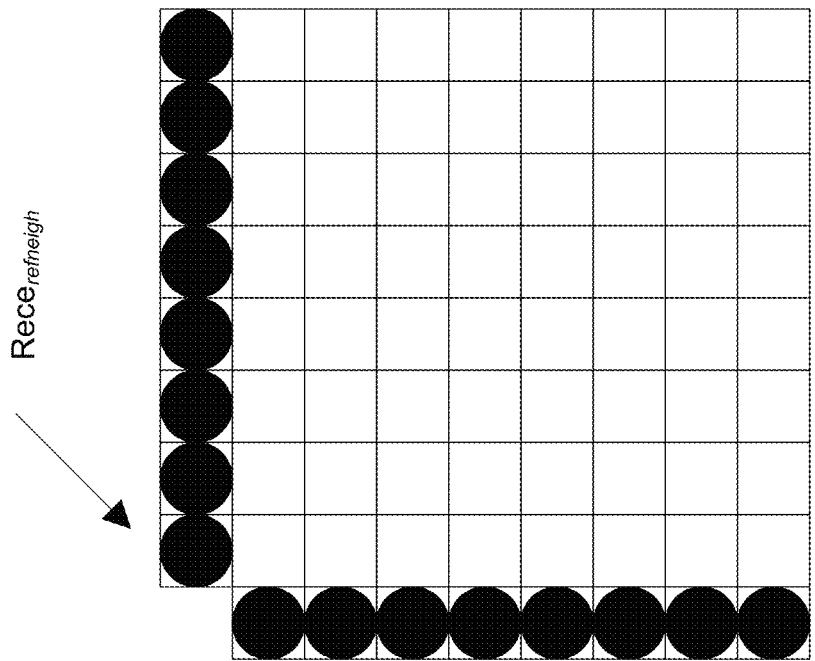
FIG. 4B is a conceptual diagram illustrating an example of neighboring samples of a reference block used for estimating IC parameters for a current coding unit, in accordance with some examples.
Figure 4A:
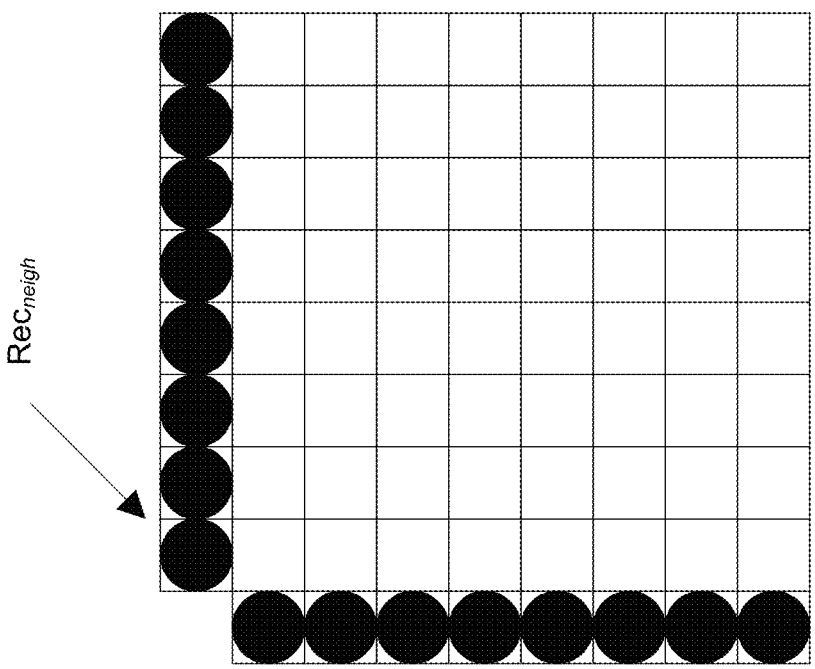
FIG. 4A is a conceptual diagram illustrating an example of neighboring samples of a current coding unit used for estimating illumination compensation (IC) parameters for the current coding unit, in accordance with some examples.

To estimate parameter a and b for a PU, two sets of pixels, as shown in FIG. 4A and FIG. 4B are used. The first set of pixels are shown in FIG. 4A and include available reconstructed neighboring pixels in a left column and an above row of the current CU (the CU that contains the current PU). The second set of pixels are shown in FIG. 4B and include corresponding neighboring pixels of the current CU's reference block. The reference block of the current CU is found by using the current PU's disparity vector.

Let $Rec_{neig}$ and $Rec_{refneig}$ denote used neighboring pixel set of the current CU and its reference block, respectively, and let 2N denote the pixel number in $Rec_{neig}$ and $Rec_{refneig}$. Then, a and b can be calculated as:

$$a = \frac{2N \cdot \sum_{i=0}^{2N-1} Rec_{neig}(i) \cdot Rec_{refneig}(i) - \sum_{i=0}^{2N-1} Rec_{neig}(i) \cdot \sum_{i=0}^{2N-1} Rec_{refneig}(i)}{2N \cdot \sum_{i=0}^{2N-1} Rec_{refneig}(i) \cdot Rec_{refneig}(i) - \left(\sum_{i=0}^{2N-1} Rec_{refneig}(i)\right)^2} \quad \text{Equation (2)}$$

$$b = \frac{\sum_{i=0}^{2N-1} Rec_{neig}(i) - a \cdot \sum_{i=0}^{2N-1} Rec_{refneig}(i)}{2N} \quad \text{Equation (3)}$$

In some cases, only a is used in the linear model and b is always set equal to 0. In some cases, only b is used and a is always set equal to 1.

In HEVC, Weighted Prediction (WP) is supported, in which case a scaling factor (denoted by a), a shift number (denoted by s) and an offset (denoted by b) is used in the motion compensation. Suppose the pixel value in position (x, y) of the reference picture is p(x, y), then p'(x, y)=((a*p(x, y)+(1<<(s−1)))>>s)+b instead of p(x, y) is used as the prediction value in motion compensation.

When WP is enabled, for each reference picture of current slice, a flag is signaled to indicate whether WP applies for the reference picture or not. If WP applies for one reference picture, a set of WP parameters (i.e., a, s and b) is sent to the decoder and is used for motion compensation from the reference picture. In some examples, to flexibly turn on/off WP for luma and chroma component, WP flag and WP parameters are separately signaled for luma and chroma component. In WP, one same set of WP parameters is used for all pixels in one reference picture.

Figures 5A, 5B:
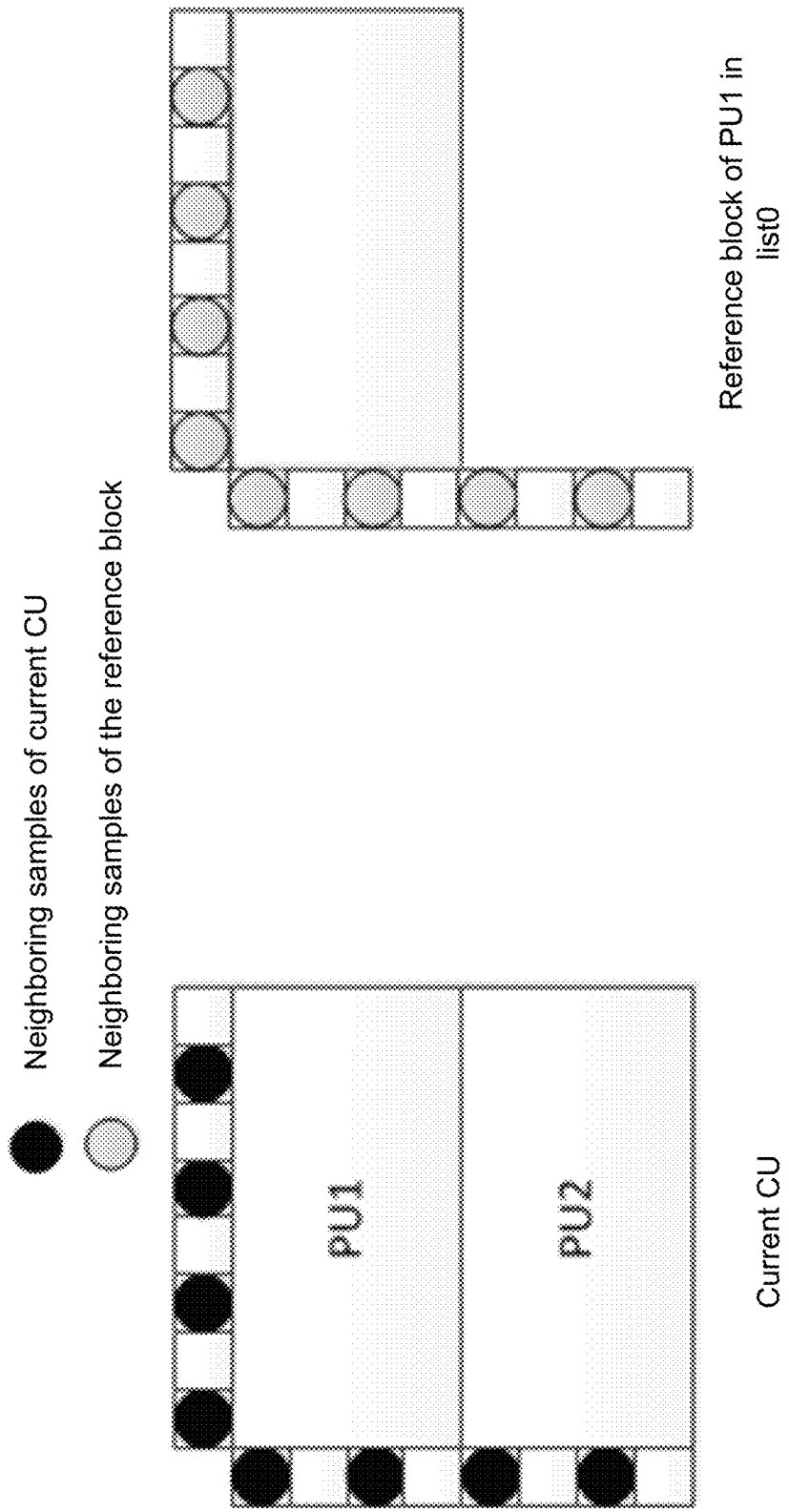
FIG. 5A is a conceptual diagram illustrating an example of neighboring samples of a current coding unit used for derivation of illumination compensation (IC) parameters for the current coding unit, in accordance with some examples.
FIG. 5B is a conceptual diagram illustrating an example of neighboring samples of a reference block used for derivation of IC parameters for a current coding unit, in accordance with some examples.

With respect to local illumination compensation (LIC) in JVET, LIC is based on a linear model for illumination changes, using a scaling factor a and an offset b. Such LIC is enabled or disabled adaptively for each inter-mode coded coding unit (CU). When LIC applies for a CU, a least square error method is employed to derive the parameters a and b by using the neighboring samples of the current CU and their corresponding reference samples. More specifically, as illustrated in FIG. 5A and FIG. 5B, the subsampled (2:1 subsampling) neighboring samples of the CU and the corresponding pixels (identified by motion information of the current CU or sub-CU) in the reference picture are used. In some examples, the IC parameters are derived and applied for each prediction direction separately.

When a CU is coded with merge mode, the LIC flag is copied from neighboring blocks, in a way similar to motion information copy in merge mode; otherwise, an LIC flag is signalled for the CU to indicate whether LIC applies or not.

Figure 6:
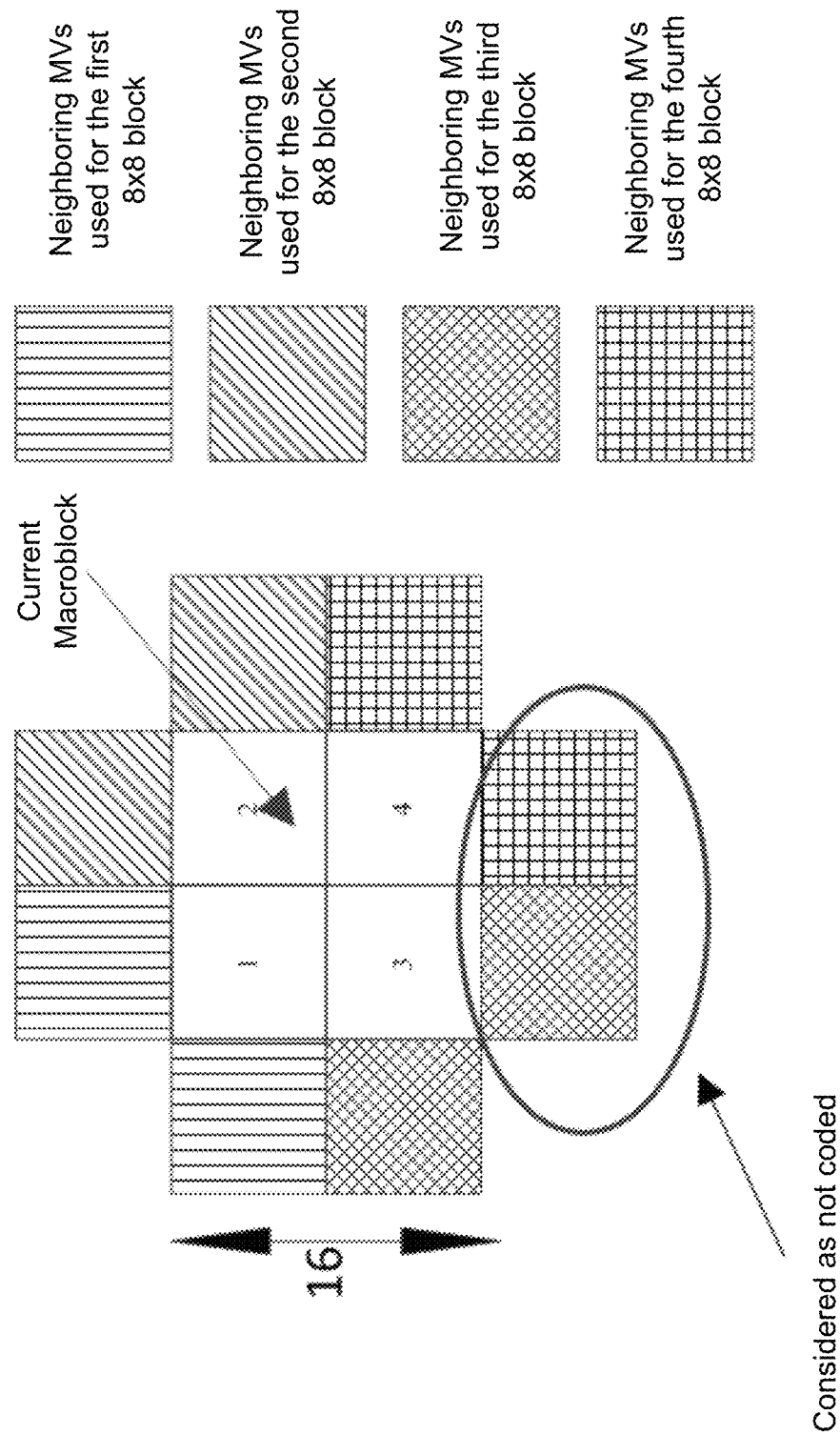
FIG. 6 is a conceptual diagram illustrating an example of overlapped block motion compensation (OBMC), in accordance with some examples.

Overlapped block motion compensation (OBMC) was proposed in the development of H.263. For example, OBMC can be performed on an 8×8 block, and motion vectors of two connected neighboring 8×8 blocks are used for current block, as shown in FIG. 6. For example, for the first 8×8 block in the current macroblock, besides its own motion vector, the above and left neighboring motion vector are also applied to generated two additional prediction blocks. In this way, each pixel in the current 8×8 block have three prediction values and weighted average of these three prediction values is used as the final prediction.

When a neighboring block is not coded or is coded as intra (using intra-prediction), meaning that the neighboring block does not have an available motion vector, the motion vector of current 8×8 block is used as the neighboring motion vector. Meanwhile, for the third and fourth 8×8 blocks of the current macroblock (as shown in FIG. 6), the below neighboring block is always not used. In other words, for each MB, no motion information from MBs below it will be used to reconstruct the pixels of the current MB during the OBMC.

Figure 7A:
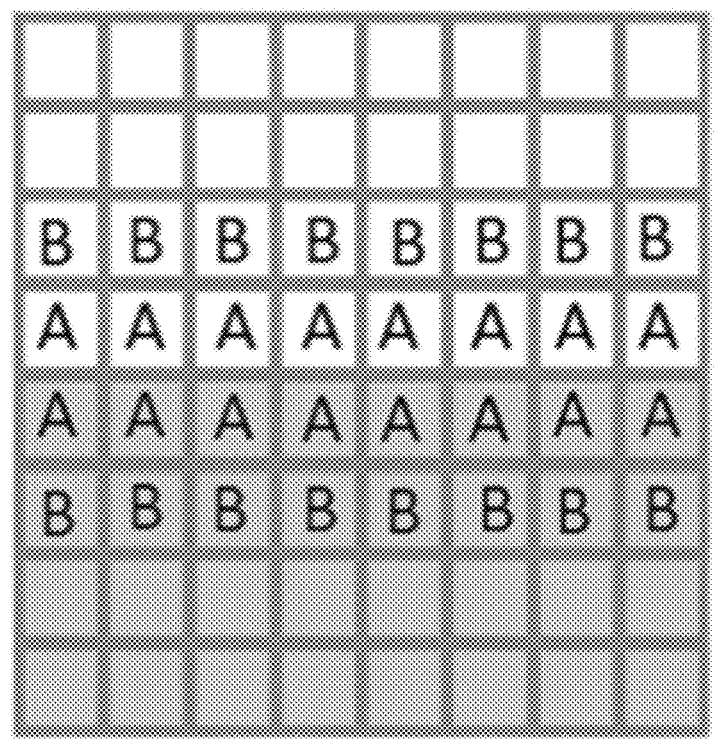
FIG. 7A is a conceptual diagram illustrating an example of OBMC for HEVC, in accordance with some examples.
Figure 7B:
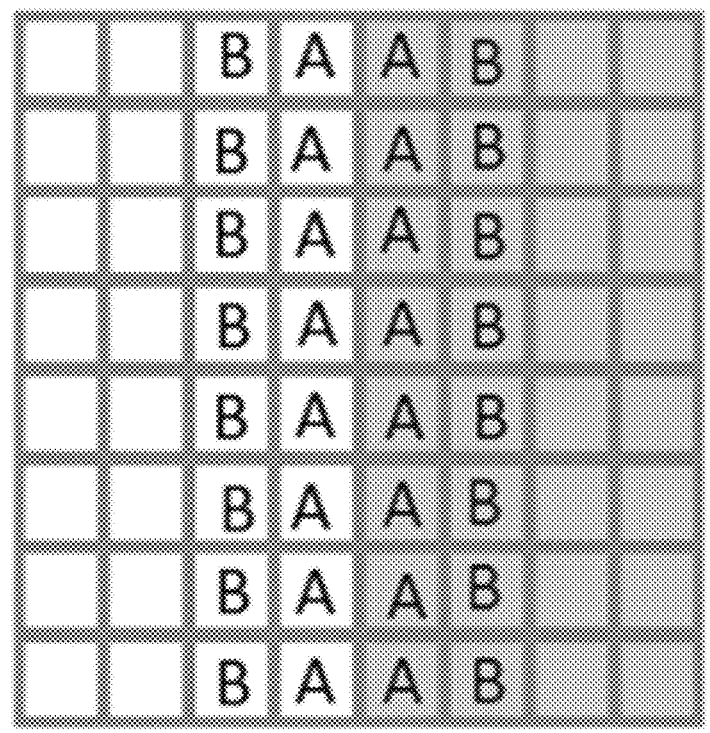
FIG. 7B is another conceptual diagram illustrating the OBMC for HEVC, in accordance with some examples.

In HEVC, OBMC was also proposed to smooth the PU boundary, as described in U.S. Publication Nos. US2013/0128974 and US2012/0177120, which are hereby incorporated by reference in their entirety for all purposes. An example of the proposed method is show in FIG. 7A and FIG. 7B. When a CU contains two (or more) PUs, lines and/or columns near the PU boundary are smoothed by OBMC. For a pixel marked with "A" or "B" in PU0 or PU1, two prediction values are generated (e.g., by applying motion vectors of PU0 and PU1, respectively), and weighted average of them are used as the final prediction.

Figure 8A:
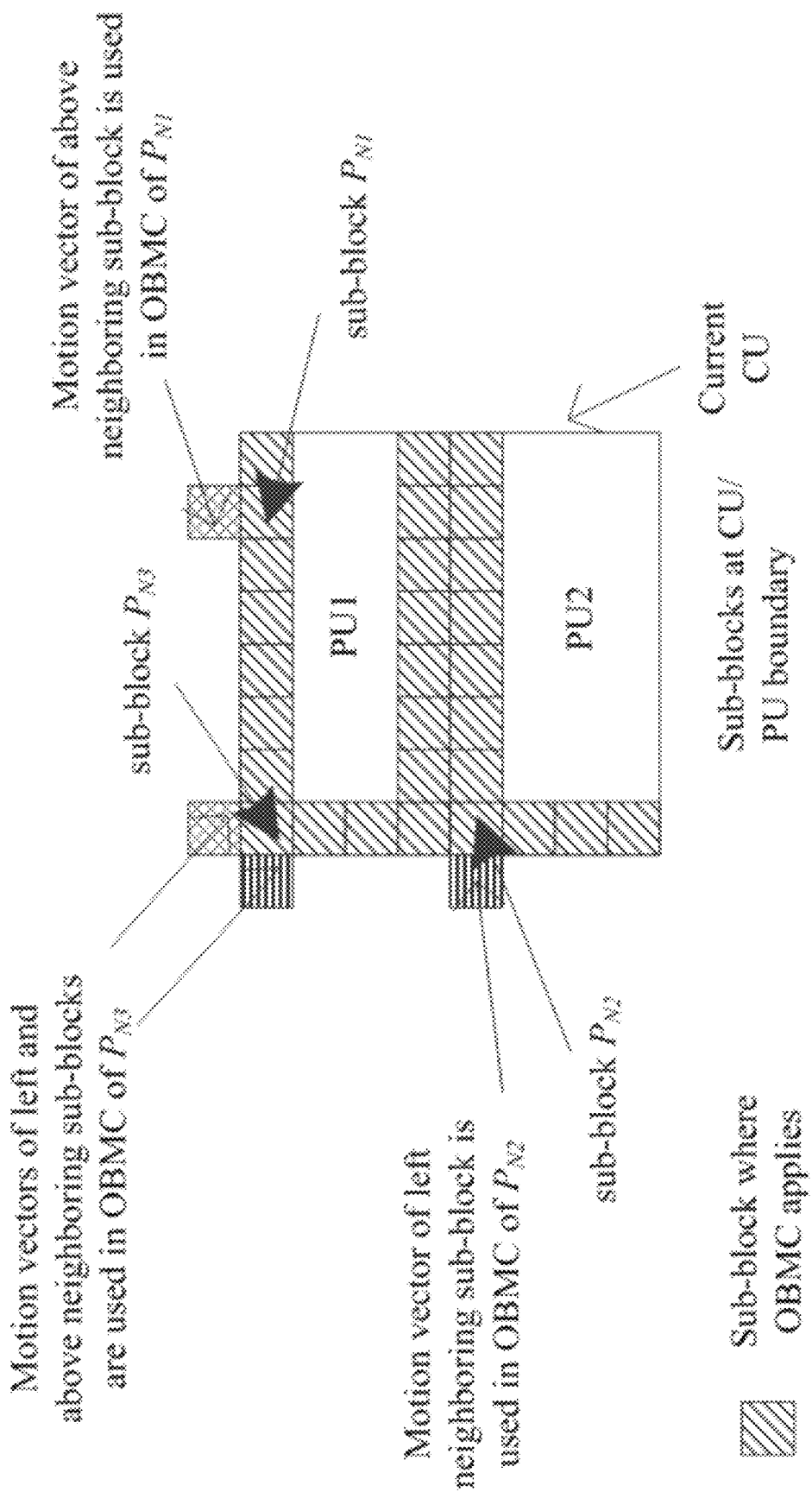
FIG. 8A is a conceptual diagram illustrating an example of sub-blocks where OBMC applies, in accordance with some examples.
Figure 8B:
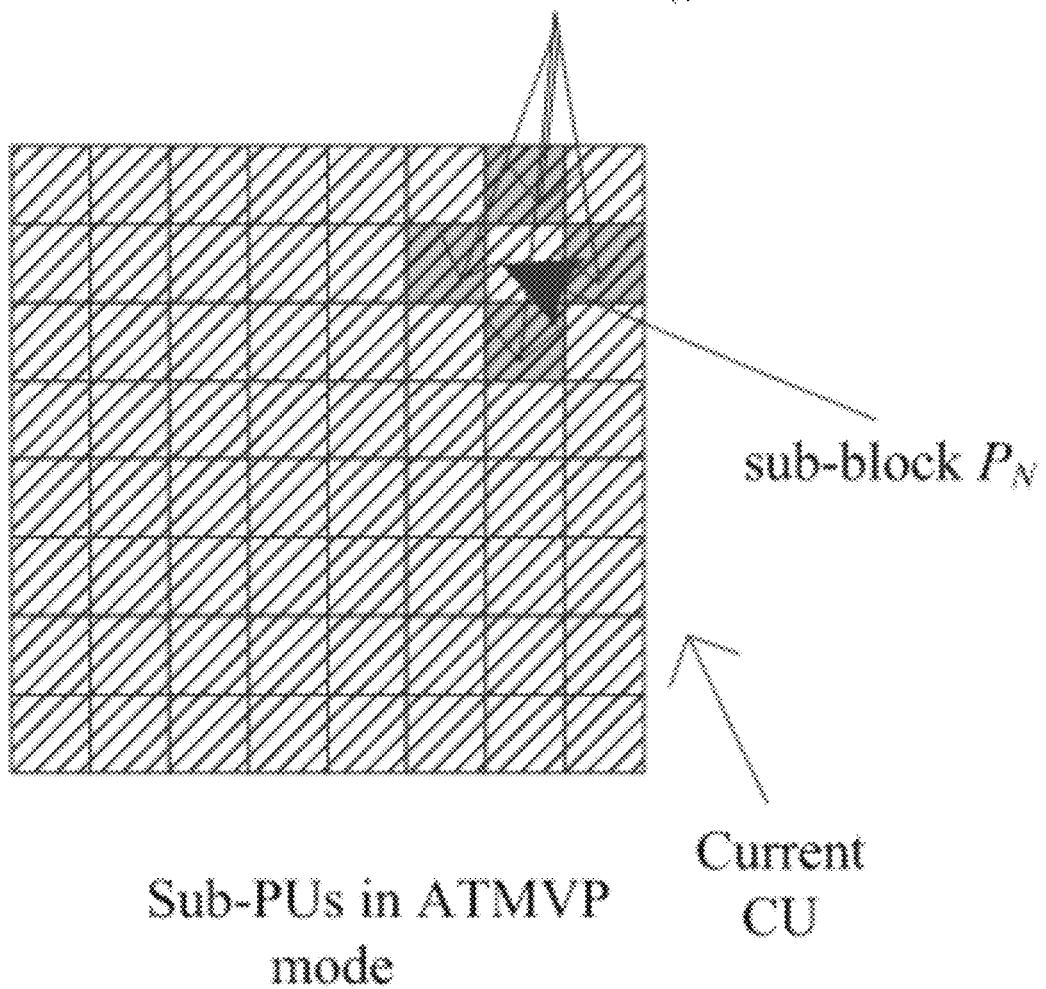
FIG. 8B is a conceptual diagram illustrating an example of sub-prediction units where OBMC applies, in accordance with some examples.

In Joint Exploration Test Model 3.0 (JEM), sub-PU level OBMC is applied. The OBMC is performed for all Motion Compensated (MC) block boundaries except the right and bottom boundaries of a CU. Moreover, it is applied for both luma and chroma components. In HEVC, a MC block is corresponding to a PU. In JEM, when a PU is coded with sub-PU mode, each sub-block of the PU is a MC block. To process CU/PU boundaries in a uniform fashion, OBMC is performed at sub-block level for all MC block boundaries, where sub-block size is set equal to 4×4, as illustrated in FIG. 8A and FIG. 8B.

When OBMC applies to a current sub-block, besides current motion vectors, motion vectors of four connected neighboring sub-blocks, if they are available and are not identical to the current motion vector, are also used to derive prediction block for the current sub-block. These multiple prediction blocks based on multiple motion vectors are weighted to generate the final prediction signal of the current sub-block.

A prediction block based on motion vectors of a neighboring sub-block is denoted as $P_N$, with N indicating an index for the neighboring above, below, left and right sub-blocks and the prediction block based on motion vectors of the current sub-block is denoted as $P_C$. When $P_N$ belongs to the same PU as $P_C$ (thus contains the same motion information), the OBMC is not performed from $P_N$. Otherwise, every pixel of $P_N$ is added to the same pixel in $P_C$, e.g., four rows/columns of $P_N$ are added to $P_C$. The weighting factors $\{1/4, 1/8, 1/16, 1/32\}$ are used for $P_N$ and the weighting factors $\{3/4, 7/8, 15/16, 31/32\}$ are used for $P_C$. The exception are small MC blocks, (i.e., when PU size is equal to 8×4, 4×8 or a PU is coded with ATMVP mode), for which only two rows/columns of $P_N$ are added to $P_C$. In this case, weighting factors $\{1/4, 1/8\}$ are used for $P_N$ and weighting factors $\{3/4, 7/8\}$ are used for $P_C$. For $P_N$ generated based on motion vectors of vertically (horizontally) neighboring sub-block, pixels in the same row (column) of $P_N$ are added to $P_C$ with a same weighting factor. Note that for PU boundaries, OBMC can be applied on each side of the boundary. Such as in FIG. 8A and FIG. 8B, OBMC can be applied along boundary between PU1 and PU2 twice. First, OBMC is applied with PU2's MV to the shaded blocks along the boundary inside PU1. Second, OBMC is applied with the PU1's MV to the shaded blocks along the boundary inside PU2. In contrast, OBMC can only be applied to one side of CU boundaries because when coding the current CU, CUs which have been coded cannot be changed.

Frame rate up-conversion (FRUC) technology is used to generate high-frame-rate videos based on low-frame-rate videos. FRUC has been widely used in display industry. FRUC algorithms can be divided into two types. One type of FRUC methods interpolate intermediate frames by simple frame repetition or averaging. However, this method provides improper results in a picture that contains a lot of motion. The other type of FRUC methods, called motion-compensated FRUC (MC-FRUC), consider object movement when it generates intermediate frames and includes two steps: (1) motion estimation (ME) and (2) motion-compensated interpolation (MCI). ME generates motion vectors (MVs), which represent object motion using vectors, whereas MCI uses MVs to generate intermediate frames.

The block-matching algorithm (BMA) is widely used for ME in MC-FRUC, as it is simple to implement. BMA divides an image into blocks and detects the movement of those blocks. Two kinds of ME are primarily used for BMA, including: unilateral ME and bilateral ME.

Figure 9:
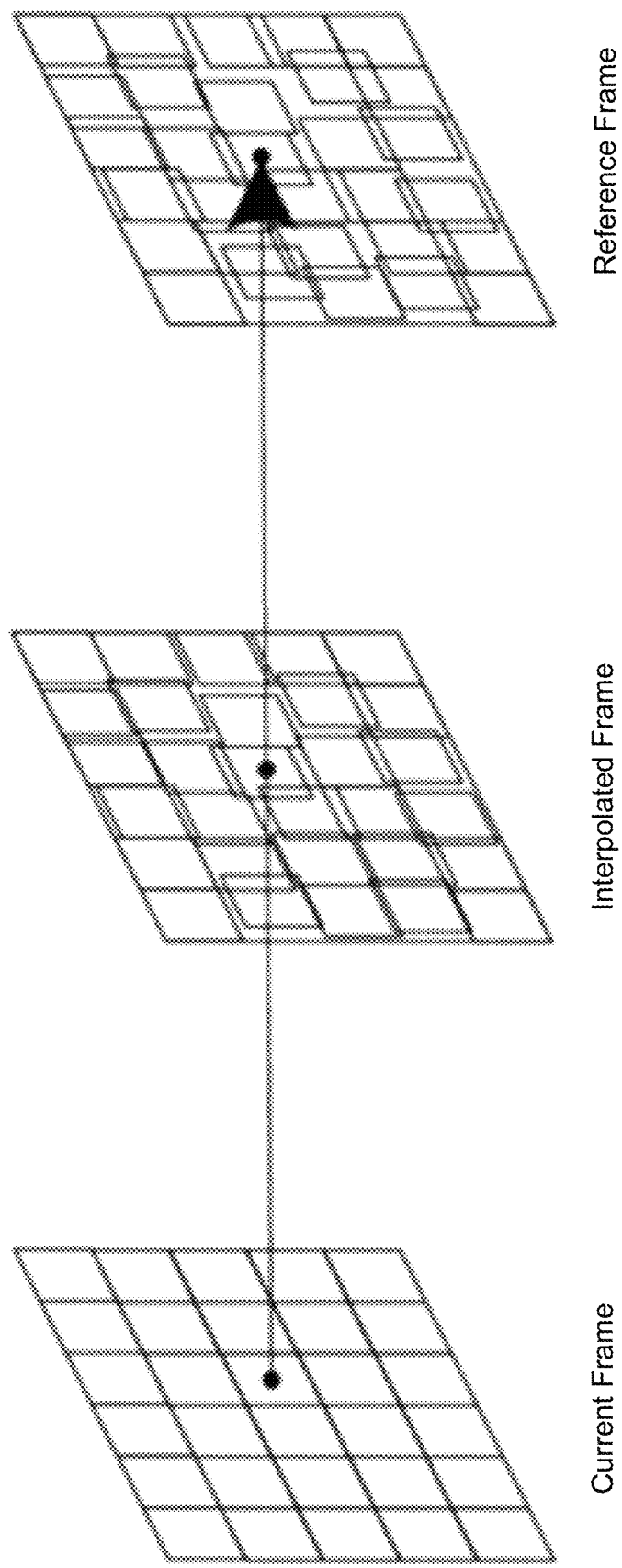
FIG. 9 is a conceptual diagram illustrating an example of unilateral motion estimation in frame rate up conversion (FRUC), in accordance with some examples.

FIG. 9 illustrates unilateral ME in FRUC. As shown in FIG. 9, unilateral ME obtains MVs by searching the best matching block from a reference frame of the current frame. Then the block on the motion trajectory in the interpolated frame can be located so that the MV is achieved. As shown in FIG. 9, three blocks in three frames are involved following the motion trajectory. Although the block in the current frame belongs to a coded block, the best matching block in the reference frame may not fully belong to a coded block; in some cases, neither does the block in the interpolated frame. Consequently, overlapped regions of the blocks and un-filled (holes) regions may occur in the interpolated frame.

To handle overlaps, simple FRUC algorithms merely involve averaging and overwriting the overlapped pixels. Moreover, holes are covered by the pixel values from a reference or a current frame. However, these algorithms result in blocking artifacts and blurring. Hence, motion field segmentation, successive extrapolation using the discrete Hartley transform, and image inpainting are proposed to handle holes and overlaps without increasing blocking artifacts and blurring.

Figure 10:
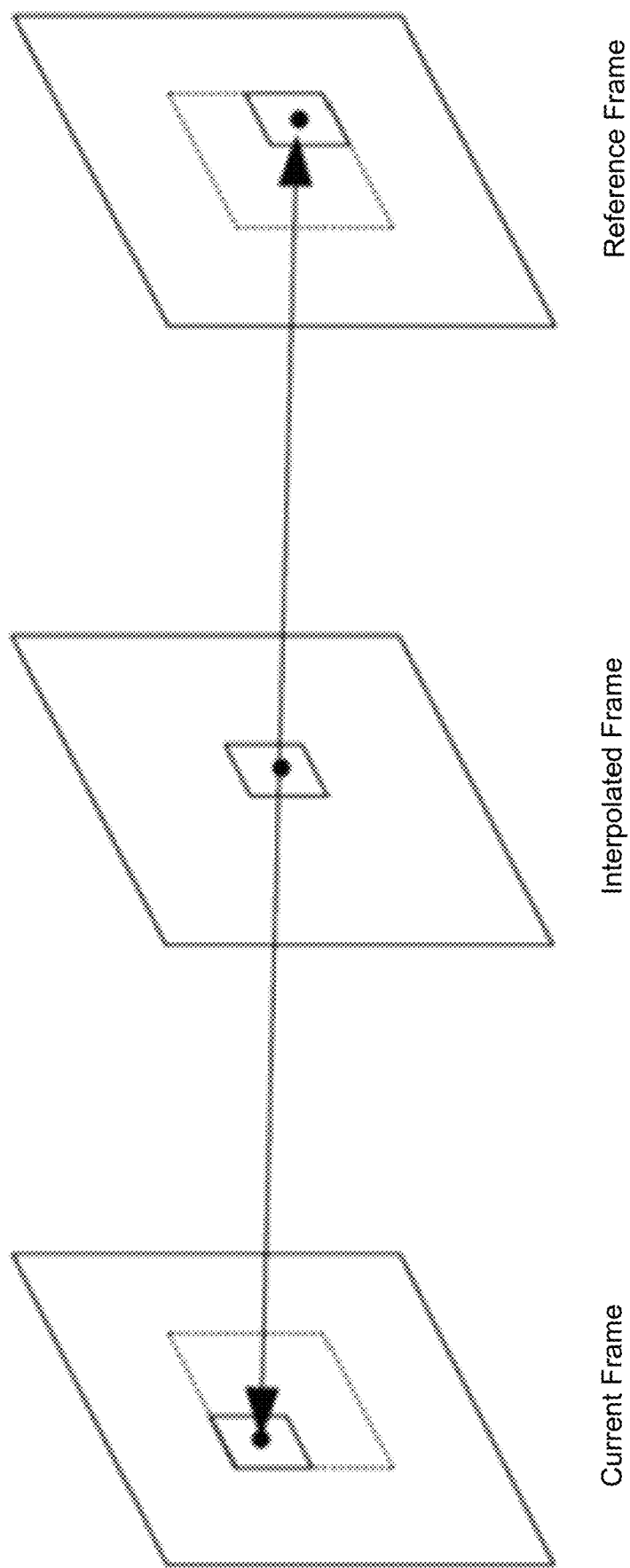
FIG. 10 is a conceptual diagram illustrating an example of bilateral motion estimation in frame rate up conversion (FRUC), in accordance with some examples.

FIG. 10 illustrates bilateral ME in FRUC. As shown in FIG. 10, bilateral ME is another solution (in MC-FRUC) that can be used to avoid the problems caused by overlaps and holes. Bilateral ME obtains MVs passing through a block in the intermediate frame using the temporal symmetry between blocks of the reference and current frames. As a result, it does not generate overlaps and holes. Since it is assumed the current block is a block that is being processed, in a certain order, e.g., as in the case of video coding, a sequence of such blocks would cover the whole intermediate picture without overlap. For example, in the case of video coding, blocks can be processed in the decoding order. Therefore, in some examples, such a method may be more suitable if FRUC ideas can be considered in a video coding framework.

Decoder side motion vector derivation can also be performed. Due to advanced video codecs, a better bit percentage of motion information in bitstream can be achieved. To reduce the bit cost of motion information, Decoder side Motion Vector Derivation (DMVD) was proposed.

Figures 11A, 11B:
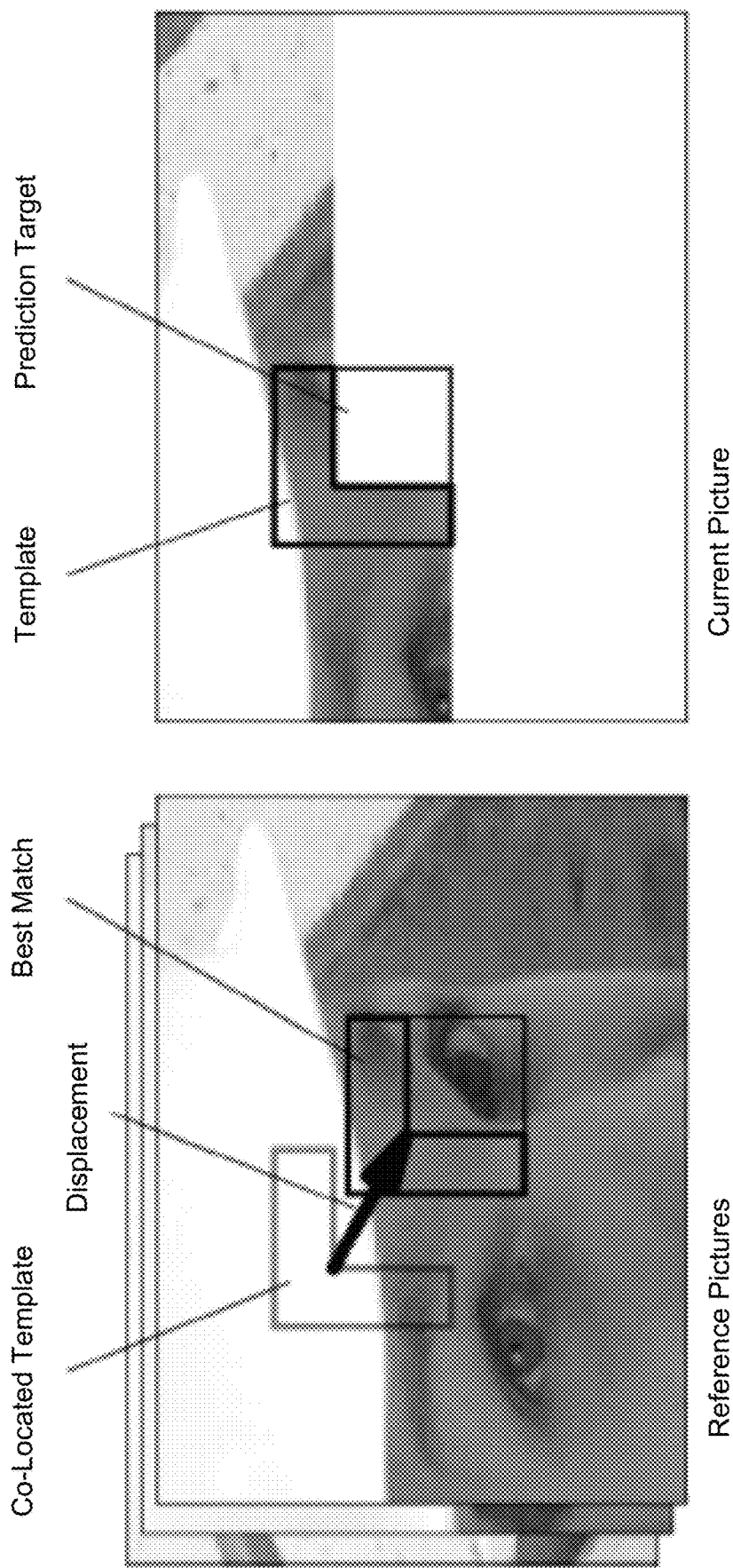
FIG. 11A is a conceptual diagram illustrating an example of reference pictures used in template matching based decoder side motion vector derivation (DMVD), in accordance with some examples.
FIG. 11B is a conceptual diagram illustrating an example of a current picture used in template matching based DMVD, in accordance with some examples.

Template matching based DMVD shows good coding efficiency improvement. FIG. 11A and FIG. 11B illustrate the idea of template matching based DMVD. Instead of searching best match for the prediction target, which is the current block at the decoder, best match of template is searched in the reference frame. Assuming the template and the prediction target are from the same object, the motion vector of the template can be used as the motion vector of the prediction target. Since the template matching is conducted at both encoder and decoder, the motion vector can be derived at decoder side to avoid signaling cost.

Figure 12:
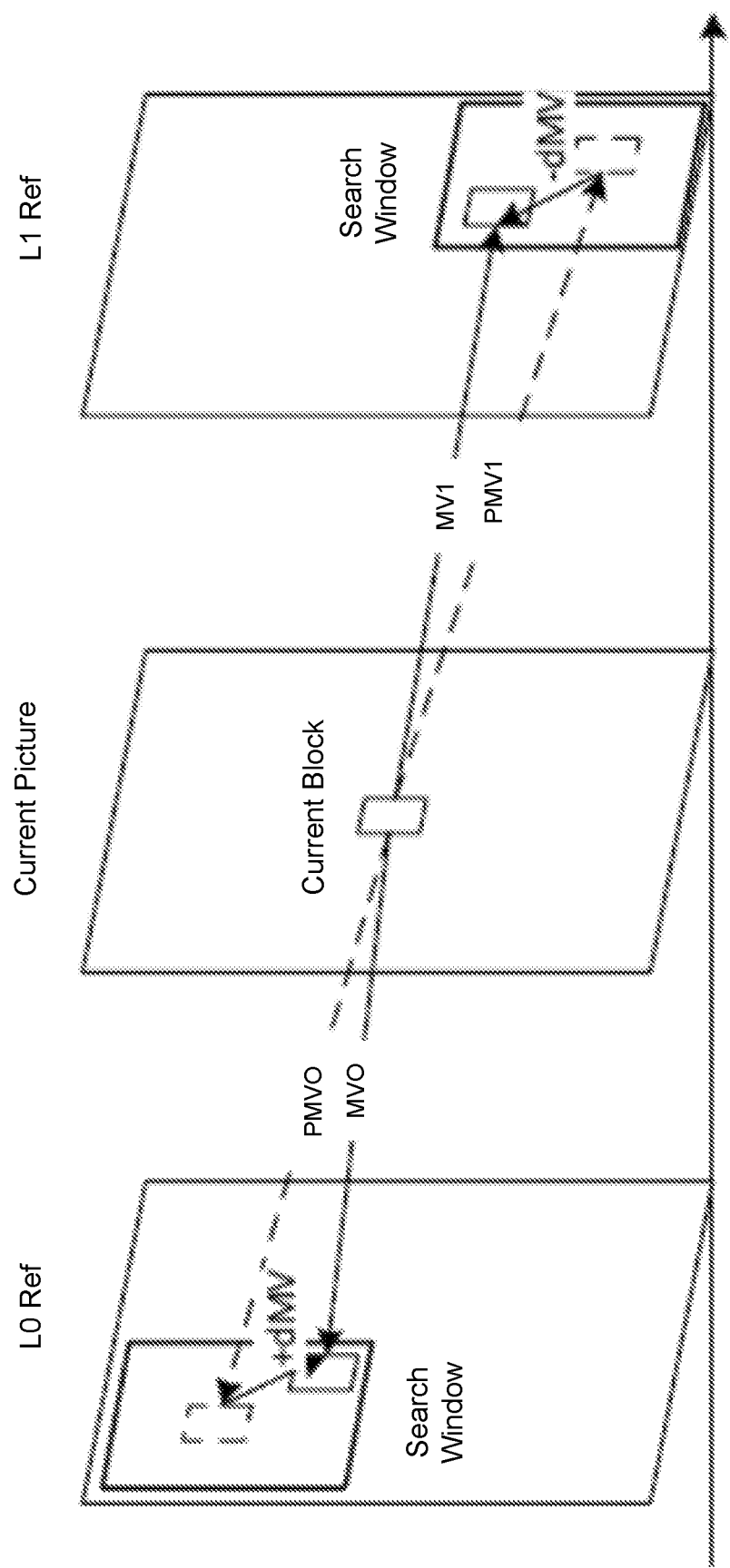
FIG. 12 is a conceptual diagram illustrating an example of mirror based bi-directional motion vector derivation in DMVD, in accordance with some examples.

Another category of DMVD is mirror based bi-directional MV derivation. The idea is similar to bilateral ME in FRUC. Mirror-based MV derivation is applied by centro-symmetric motion estimation around search centers in fractional sample accuracy. The size and/or location of the search window can be pre-defined and can be signaled in bitstream. FIG. 12 illustrates mirror based bi-directional MV derivation in DMVD. The term dMV in FIG. 12 is an offset which is added to PMV0 and is subtracted from PMV1 to generate a MV pair, MV0 and MV1. All the values of dMV inside the search window will be checked and the Sum of Absolute Difference (SAD) between the L0 and L1 reference blocks is used as the measurement of Centro-symmetric motion estimation. An MV pair with the minimum SAD is selected as the output of Centro-symmetric motion estimation. Since the method needs a future reference (reference at a temporal position later than the current frame) and an earlier reference (reference at a temporal position earlier than the current frame) for the SAD matching, it is cannot be applied to P frame or low-delay B frames in which only former reference is available.

Figure 13:
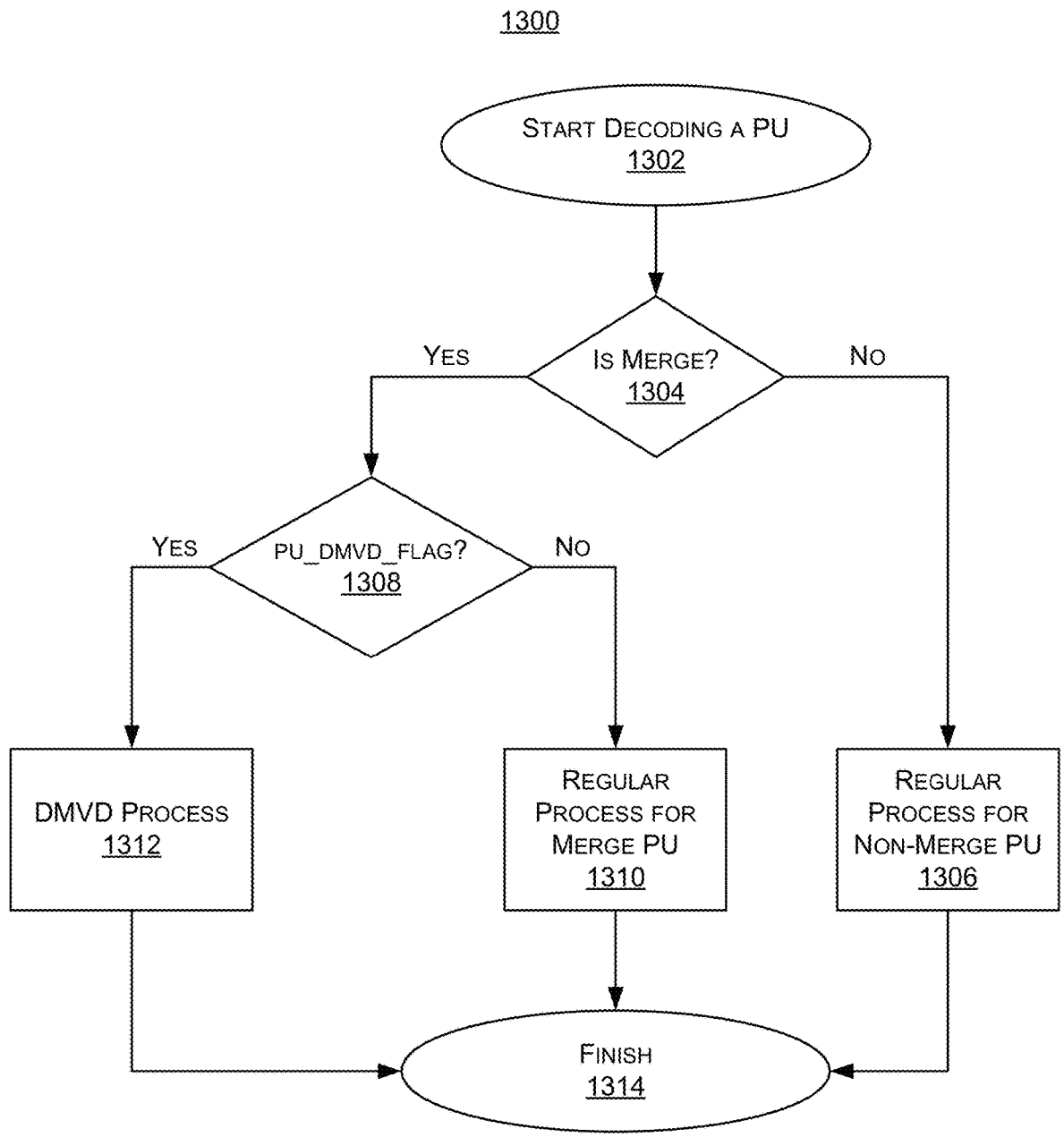
FIG. 13 is a flowchart illustrating an example of decoding a prediction unit (PU) using DMVD, in accordance with some examples.

In some cases, it has been proposed to combine the mirror based bi-directional MV derivation with merge mode in HEVC. For example, a flag called pu_dmvd_flag is added for a PU of B slices to indicate if DMVD mode is applied to the current PU. FIG. 13 is a flowchart of PU decoding with pu_dmvd_flag added. Since DMVD mode does not explicitly transmit any MV information in the bitstream, the decoding process of integrating pu_dmvd_flag with the syntax of Merge mode in HEVC coding process is presented as shown in FIG. 13.

Various problems exist with one or more of the techniques described above. For example, in existing LIC algorithms, during bi-predictive motion compensation, LIC parameters are derived independently from Ref0 and Ref1 without considering their joint influence on the predictor. For example, in a bi-prediction case, separate LIC-compensated prediction patches are determined, and an equal weight (0.5) is used to combine the LIC-compensated prediction patches to generate the final bi-predictor. Furthermore, in the existing LIC algorithm, only a subset of a single row and a single column of neighboring pixels are used to derive the LIC parameters, which may lead to sub-optimal solutions. Even further, in the existing LIC algorithm, integer-positioned pixels are used to derive the LIC parameters without filtering (without fractional-pel accuracy), which may lead to producing sub-optimal parameters due to noisy reconstructed pixels. Also, when LIC is enabled, OBMC is also enabled for Bi-predictive motion compensation, which may lead to over-smoothing the boundary pixels of blocks.

Various techniques are described herein to solve the aforementioned problems. In some cases, the techniques described herein may be applied individually. In some cases, any combination of the techniques described herein may be applied. In this application, in some cases, reference index information is regarded as a part of motion information. In some examples, they are jointly called as a set of motion information.

In some examples, methods and systems are described herein for deriving one or more local illumination compensation (LIC) parameters for a block of a picture based on templates of multiple reference pictures. Both the encoder and decoder can follow the same procedure to derive the illumination compensation parameters using the techniques described herein. For example, both the encoder and decoder can derive weights (or scaling factors) and an offset using the same procedure without the parameters having to be signaled (e.g., to the decoder) in the bitstream or using another signaling mechanism. In some cases, the only difference in the encoder and decoder LIC parameter derivation is that, at the encoder side, it may need to perform a joint optimization between the switch of LIC and motion search. In some examples, an exhaustive search can be employed.

The LIC method described herein includes an alternative method to solve the LIC parameters for bi-predictive motion compensation. For instance, during bi-predictive motion compensation, the LIC parameters can be derived by considering the template of both a block (Ref0) of a first reference picture from reference picture list 0 (RefPicList0) and a block (Ref1) of a second reference picture from reference picture list 1 (RefPicList1) simultaneously. In one example, a first template of the first reference picture and a second template of the second reference picture are used simultaneously to derive one or more local illumination compensation parameters. Such a technique provides a more optimal predictor than existing techniques that derive LIC parameters independently from Ref0 and Ref1 without considering their joint influence on the predictor. For example, using existing LIC solutions, the LIC parameters are derived by finding the solution of a pair of data sets formed by the neighboring pixels between current reconstructed frame and a reference frame. In bi-predictive motion compensation, the calculation of the existing LIC solution is done with respect to reference blocks of L0 and L1 individually, using separate cost functions. An equal-weight bi-averaging operation has to be used to combine the LIC-compensated predictors. Deriving the LIC parameters separately for Ref0 and Ref1 may pose an issue when the temporal distance of the two reference frames to the current frames are unequal. Also, when there is a non-uniform illumination change temporally, the equal-derivation of the LIC parameter may result in sub-optimal parameters when it comes to bi-prediction.

Figure 14:
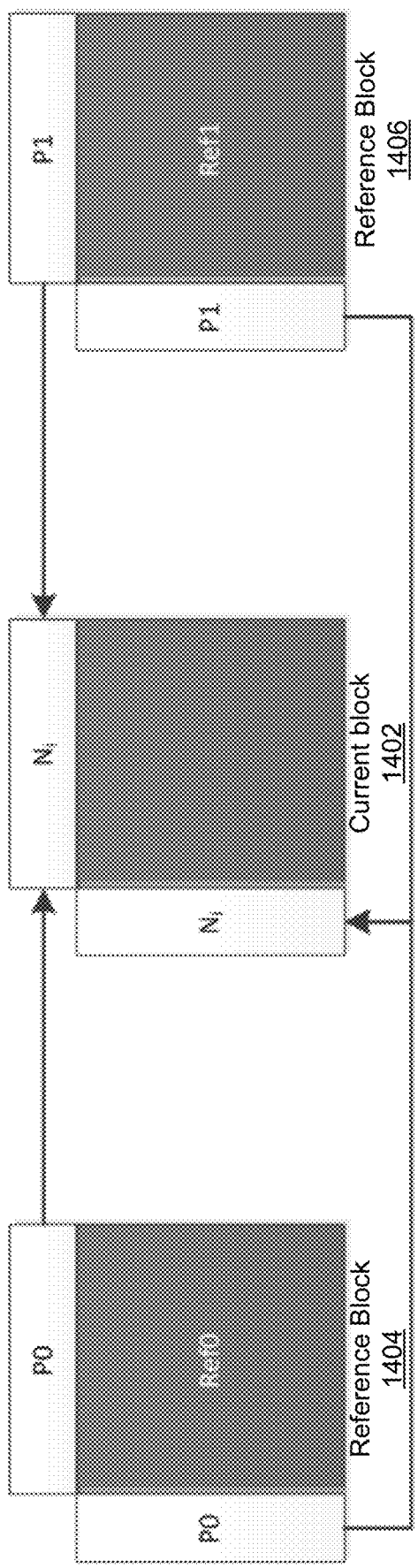
FIG. 14 is a conceptual diagram illustrating an example of template-based derivation of local illumination compensation parameters, in accordance with some examples.

FIG. 14 is a diagram illustrating template-based derivation of LIC parameters. The current block 1402 is a block of the current picture for which motion compensation is being performed. The reference picture block 1404 is a block (Rem) of a first reference picture from reference picture list 0 (RefPicList0), and the reference picture block 1406 is a block (Ref1) of a second reference picture from reference picture list 1 (RefPicList1). The term P0 denotes the template region of Ref0, and the term P1 denotes the template region of Ref1, respectively. The term $N_i$ denotes the template region of the current block 1402. The samples in the template Ni are part of a reconstructed block of a reconstructed frame neighboring the current block 1402.

Illumination compensation parameters can include an offset, one or more weights, a shift number, or other suitable illumination compensation parameters. A weight can also be referred to as a scaling factor. By using templates of a first reference picture and a second reference picture, for example, the one or more weights can include a first weight for the template of the first reference picture and a second weight for the template of the second reference picture.

In some implementations, a linear least square regression can be used to estimate the LIC parameters in bi-predictive motion compensation. In one example, the derivation of the LIC parameters can be done by solving a cost function (e.g., Eq. (4) or Eq. (10) below) using the below least-square equations (e.g., Eqs. (5)-(6) or Eqs. (5) and (11) below). For instance, a subset of samples from one or more neighboring blocks of the current block can be used to derive the LIC parameters. Samples from neighboring blocks of the current block can be used to find a possible illuminance changes in the current block 1402, because it can be assumed that there is a strong correlation between the neighboring samples (in the neighboring blocks) and the current samples (in the current block 1402). For instance, it can be assumed that the current block and the neighboring block, which share the same motion information, should contain very similar illuminance values. Another reason to use neighboring samples is that the current block has not yet been predicted, and there may not be pixels to use from the current block, in which case the neighboring samples (which have been reconstructed) can be used in performing the template matching for motion compensation of the current block.

In one illustrative example, either a top neighbor, a left neighbor, or both top neighbor and the left neighbor may be used. For instance, the template N shown in FIG. 14 can include a subset of samples from a top neighbor and a left neighbor of the current block 1402. The template P0 shown in FIG. 14 can include a subset of pixels from a top neighbor and a left neighbor of the reference block 1404, and the template P1 can include a subset of pixels from a top neighbor and a left neighbor of the reference block 1406. The samples of the neighboring blocks used in the templates P0 and P1 can include samples corresponding to the neighboring samples used in the template $N_i$. In some cases, the corresponding samples used in templates P0 and P1 can be identified by motion information of the current block. In one illustrative example at the decoder side, the motion vectors can be signaled in the bitstream, through either the merge mode, FRUC merge mode, or the regular AMVP mode. The decoder can reconstruct the motion information (e.g., motion vectors and reference indexes) and the reference picture order count (POC). The decoder can identify the reference pictures using the reference indexes, and can identify the reference blocks 1404 and 1406 within the reference pictures using the motion vectors. The decoder can then derive the associated template regions P0 and P1 of the reference blocks 1404 and 1406. For example, once the reference blocks 1404 and 1406 are determined in the reference pictures, the top and left neighboring samples (e.g., one or more rows and one or more columns) from neighboring blocks can be determined as the template regions P0 and P1. Such a technique is different from FRUC template matching, where the template of the current block is first determined, then the template is used to search the motion vectors on given reference frames.

In some examples, to solve the weights for bi-predictive LIC, the following cost function is considered:

$$E = \frac{1}{2}\sum_{i=0}^{N-1} (N_i - w_0 P_{0,i} - w_1 P_{1,i} - o)^2 + \frac{\lambda}{2}(w_0 + w_1 - 1)^2 \quad \text{Equation (4)}$$

where $\lambda$ is a regularization parameter, the term $N_i$ is the top neighboring pixels and/or the left neighboring pixels of the current block in the current reconstructed frame (e.g., the template $N_i$ of the current block 1402 shown in FIG. 14), the terms $P_{0,i}$ and $P_{1,i}$ are the top and/or the left neighboring pixels of the referenced block in the reference frames of List0 and List1 (e.g., the template P0 of reference block 1404 and the template P1 of reference block 1406 shown in FIG. 14), respectively, the term i is the pixel index within the template region, and the term N is the total number of pixels in the template region (N1, P0, and/or P1).

The term o is the offset, and the terms $w_0$ and $w_1$ are the weights. The weights $w_0$ and $w_1$ and the offset o are used to compensate for the discrepancy induced by illumination changes in a series of picture. For example, the offset o can indicate the average luminance change by considering the two reference frames simultaneously. The weight $w_0$ is multiplied by the prediction samples generated from the reference block 1404 (from List0), which are the samples in the template P0 shown in FIG. 14. The weight $w_1$ is multiplied by the prediction samples generated from the reference block 1406 (from List1), which are the samples in the template P1 shown in FIG. 14. The weights $w_0$ and $w_1$ are adjustable parameters and are based on certain characteristics of a picture. For example, the weights $w_0$ and $w_1$ can be based on the temporal distance of the reference picture being used to predict the current picture, based on whether the picture is becoming lighter or darker, or other characteristics. In one example, if there are two reference pictures, with the first reference picture sitting closer to the current picture than the second reference picture, different weights can be applied to these two different reference pictures to find better prediction examples for the current block for which motion compensation is being performed. For instance, a smaller weight can be applied to samples of the second reference picture (which is further away from the current picture) than a weight that is applied to samples of the first reference picture (which is closer to the current picture). In another example, a higher weight can be applied to samples that have less illumination change. For example, as shown by eqs. (6) below, a cross correlation is taken from neighboring samples to the prediction samples of a first reference frame, and, if the reference frame is farther away and neighboring samples of the first reference frame are darker than the neighboring samples of a second reference frame, then the weight can be made less. The final prediction is generated according to Eq. (9).

Eq. (4) can be solved using ordinary linear least-square regression to obtain the values of the weights $w_0$ and $w_1$ and the offset o. For example, by solving Eq. (4) using linear least-square regression, the solution to eq. (4) can be found as:

$$w_0 = \frac{c \cdot d - b \cdot e}{a \cdot c - b^2} \quad \text{Equations (5)}$$

$$w_1 = \frac{a \cdot e - b \cdot d}{a \cdot c - b^2}$$

$$o = \frac{\left(\sum_{i=0}^{N-1} N_i - w_0 \sum_{i=0}^{N-1} P_{0,i} - w_1 \sum_{i=0}^{N-1} P_{1,i}\right)}{N}$$

Accordingly, the weights and offset can be found by solving Eq. (4). In some cases, if the determinant of the least square solution (term $a \cdot c - b^2$ in Eqs. (5)) is equal to zero, the unidirectional LIC can be used (using a single reference block at a time) instead of bi-directional LIC (using two reference blocks simultaneously). In some cases, to avoid over-compensation, the offset o in Eqs. (5) can be further constrained. One example of the values can be associated with the bit depth (BD), where the offset can be restricted to the range of $[-2^{BD}, 2^{BD}-1]$.

In Eqs. (5), N is the number of pixels in the template being analyzed ($N_i$, P0, and/or P1), and the terms $\{a, b, c, d, e\}$ are defined as follows:

$$a = \sum_{i=0}^{N-1} P_{0,i}^2 - \frac{\left(\sum_{i=0}^{N-1} P_{0,i}\right)^2}{N} + \lambda \quad \text{Equations (6)}$$

$$b = \sum_{i=0}^{N-1} P_{0,i} P_{1,i} - \frac{\left(\sum_{i=0}^{N-1} P_{0,i}\right)\left(\sum_{i=0}^{N-1} P_{1,i}\right)}{N} + \lambda$$

$$c = \sum_{i=0}^{N-1} P_{1,i}^2 - \frac{\left(\sum_{i=0}^{N-1} P_{1,i}\right)^2}{N} + \lambda$$

-continued $$d = \sum_{i=0}^{N-1} P_{0,i} N_i - \frac{\left(\sum_{i=0}^{N-1} P_{0,i}\right)\left(\sum_{i=0}^{N-1} N_i\right)}{N} + \lambda$$

$$e = \sum_{i=0}^{N-1} P_{1,i} N_i - \frac{\left(\sum_{i=0}^{N-1} P_{1,i}\right)\left(\sum_{i=0}^{N-1} N_i\right)}{N} + \lambda$$

The terms a and c represent the variance across the samples from the template P0 and the template P1, respectively. For example, the term a represents a variance of the prediction samples of the template P0 for the reference block 1404 (Ref0), and the term c represents a variance of the prediction samples of the template P1 for the reference block 1406 (Ref1). Using a as an example, a sample value $P_{0,i}$ from the template P0 is squared, and the mean of the samples in the template P0 is subtracted from the squared sample value $P_{0,i}$, which provides the variance of the sample value $P_{0,i}$. The mean is shown as the sum of all the samples in the template P0, squared, divided by the total number of samples in the template P0. The regularization parameter $\lambda$ is also used (for each of the terms a-e), as described below. The definition of the term c is similar to the definition of the term a, but with respect to a sample value $P_{1,i}$ from the template P1.

The term b is related to the covariance (or cross correlation in some cases) of the corresponding samples in P0 and P1. The term d is related to the covariance (or cross correlation in some cases) between the samples in the template P0 and the corresponding samples in the template $N_i$. Similarly, term e is related to the cross correlation between the samples in the template P1 and the corresponding samples in the template $N_i$. As shown in eqs. (5), the weights $w_0$ and $w_1$ are determined based on the terms a, b, c, d, and e. The weights $w_0$ and $w_1$ represent a measure of similarity between the current neighboring samples (of the current block) and the referenced neighbors of the reference blocks. If the variance of the other referenced neighbors is high, or the covariance between the referenced neighbors and the current neighbors is high, the weights are higher. If the covariance of the two referenced neighbors is high, or the covariance of the current neighbors and the referenced neighbors is high, the weighting factor is lower.

The equations (6) can re-written as:

$a = N \cdot \text{VAR}(P_0) + \lambda$ $b = N \cdot \text{COV}(P_0, P_1) + \lambda$ $c = N \cdot \text{VAR}(P_1) + \lambda$ $d = N \cdot \text{COV}(N_i, P_0) + \lambda$ $e = N \cdot \text{COV}(N_i, P_1) + \lambda$     Equations (6)'

The value of the regularization parameter $\lambda$ can be chosen as a positive value:

$$\lambda = k \cdot \left(\sum_{i=0}^{N-1} P_{0,i}^2 + \sum_{i=0}^{N-1} P_{1,i}^2\right) \quad \text{Equation (7)}$$

where k is a scaling factor whose absolute value is less than one. Alternatively, $\lambda$ can be chosen to be the maximum of the two sum of squares:

$$\lambda = k \cdot \max\left(\sum_{i=0}^{N-1} P_{0,i}^2, \sum_{i=0}^{N-1} P_{1,i}^2\right) \quad \text{Equation (8)}$$

The final prediction samples are created by:

$P(x,y) = w_0 P_0(x,y) + w_1 P_1(x,y) + o$     Equation (9)

where $(x,y) \in PU_c$

The final prediction sample P(x,y) represents a sample value that will be used for a sample at a position (x,y) in the current block 1402. As described herein, the application of the LIC can be integrated into the conventional bi-predictive motion compensation. When considering the template-based search to find the optimal weight, Eq. (9) can still be used to apply the optimal weights during bi-predictive motion compensation.

In some examples, more than one derivation method to derive the LIC parameters can be performed. In such examples, the encoder or other transmitter-side device can signal to the decoder which derivation method is to be used at a sequence level (e.g., in the VPS and/or the SPS), at the picture level (e.g., in the PPS), at the slice level (e.g., in the slice header), at the CTU level, at CU level, at PU level, or a combination thereof, or other suitable signaling level.

Another illustrative example of an alternative cost function that be used is defined as:

$$E = \frac{1}{2}\sum_{i=0}^{N-1}(N_i - w_0 P_{0,i} - w_1 P_{1,i} - o)^2 + \frac{\lambda}{2}(w_0 - 0.5)^2 + \frac{\lambda}{2}(w_1 - 0.5)^2 \quad \text{Eq. (10)}$$

The linear least square solution to the cost function in Eq. (10) has a similar form of Eq. (5), but with different definitions for each term in {a, b, c, d, e}:

$$a = \sum_{i=0}^{N-1} P_{0,i}^2 - \frac{\left(\sum_{i=0}^{N-1} P_{0,i}\right)^2}{N} + \lambda \quad \text{Equations (11)}$$

$$b = \sum_{i=0}^{N-1} P_{0,i} P_{1,i} - \frac{\left(\sum_{i=0}^{N-1} P_{0,i}\right)\left(\sum_{i=0}^{N-1} P_{1,i}\right)}{N}$$

$$c = \sum_{i=0}^{N-1} P_{1,i}^2 - \frac{\left(\sum_{i=0}^{N-1} P_{1,i}\right)^2}{N} + \lambda$$

$$d = \sum_{i=0}^{N-1} P_{0,i} N_i - \frac{\left(\sum_{i=0}^{N-1} P_{0,i}\right)\left(\sum_{i=0}^{N-1} N_i\right)}{N} + 0.5 \cdot \lambda$$

$$e = \sum_{i=0}^{N-1} P_{1,i} N_i - \frac{\left(\sum_{i=0}^{N-1} P_{1,i}\right)\left(\sum_{i=0}^{N-1} N_i\right)}{N} + 0.5 \cdot \lambda$$

More generally, Eq. (10) can be defined as:

$$E = \frac{1}{2}\sum_{i=0}^{N-1}(N_i - w_0 P_{0,i} - w_1 P_{1,i} - o)^2 + \frac{\lambda}{2}(w_0 - \text{Default}_{W0})^2 + \frac{\lambda}{2}(w_1 - \text{Default}_{W1})^2 \quad \text{Equation (12)}$$

The value of $\text{Default}_{W0}$ and $\text{Default}_{W1}$ can be set to any suitable value, and can be signaled in the bitstream at different levels, such as at the picture level, the slice level, the block level, or at the level of a group of blocks. As one example, the weighted prediction parameter signaled in the slice header can be used to derive the value of $\text{Default}_{W0}$ and $\text{Default}_{W1}$. The example cost function in eq. (10) uses a value of 0.5 for both of the $\text{Default}_{W0}$ and $\text{Default}_{W1}$ terms. However, such terms are configurable and can be set to any suitable value.

In some examples, the least square solution can be calculated based on multiple lines and/or columns of template from a neighbor (e.g., either top neighbor, a left neighbor, both the top and left neighbors, or other neighbors). Example numbers (and in some cases, the typical numbers) of lines and/or columns includes one, two, four, or any other suitable number of rows and/or columns. For instance, more than one line and/or column of samples from the left neighbor of the current block 1402, and more than one line and/or column of samples from the top neighbor of the current block 1402 can be included in the template $N_i$. In such cases, there will be a corresponding number of lines and/or columns of samples in the templates P0 and P1. In one illustrative example, the template N can include 2 columns of pixels from the left neighboring block of the current block 1402, and 2 rows of pixels from the top neighboring block of the current block 1402. In such an example, the template P0 can include 2 columns of pixels from the left neighboring block of the reference block 1404, and 2 rows of pixels from the top neighboring block of the reference block 1404. Similarly, in such an example, the template P1 can include 2 columns of pixels from the left neighboring block of the reference block 1406, and 2 rows of pixels from the top neighboring block of the reference block 1406.

The equations 4-11 above may be modified when multiple lines and/or columns are included in a template. For example, the number of pixels in the template region (the term N) would change, based on the number of lines and/or columns in the template. For example, if the blocks are 16×16 blocks (16 rows of pixels by 16 columns of pixels), and if two lines from the top neighboring block and two columns from the left neighboring block are used, the $N_i$ template will include 64 samples (32 samples from the left neighboring block and 32 samples from the top neighboring block), and the value of N will be 64. In such an example, the P0 and P1 templates will also include 64 samples.

In some cases, integer-positioned samples (or pixels) are used for the derivation of the LIC parameters. In some cases, fractional-positioned samples are used for the derivation of the LIC parameters. In some cases, integer-positioned samples and fractional-positioned samples can both be used. For example, the true displacements of moving objects between pictures are continuous and tend to not follow the sampling grid of the pictures in a video sequence. Because of this, fractional accuracy can be used for motion vectors instead of integer accuracy, leading to a decrease in residual error and an increase in coding efficiency of video coders. If a motion vector has a fractional value, the reference block needs to be interpolated accordingly. For example, a motion vector for a sample of a current block can point to a fractional-pel position in a reference block. A fractional-pel position refers to samples (e.g., a luma sample) at fractional sample locations (non-integer locations) in the block. Such locations need to be generated by interpolation. In one example when factional-positioned samples are used, an interpolated or filtered version of the template (e.g., P0 or P1) can be used to reduce the quantization error from the reconstructed pixels when deriving the LIC parameters. Such an interpolated version of a template can be generated using one or more interpolation filters. For example, if a motion vectors of a current block points to a fractional-pel position in a reference frame, an interpolation filter can be used to generate a better set of samples for the template before deriving the LIC parameters. For example, the type of interpolation filters used can include, but are not limited to, a bi-linear interpolation filter, an 8-tap interpolation filter, defined in the HEVC standard, or any other suitable filter. Currently illumination compensation solutions do not use any fractional-pel positioned samples. For instance, using current solutions, assuming a motion vector points to a fractional-pel position, the value of the predictor to be used in LIC derivation is rounded to the nearest integer reference sample position, and then the resulting samples are used to derived the LIC parameters.

In one example, some samples from the templates (P0 and P1) can be determined to be outliers and can be excluded. For example, the least square solution can be calculated based on samples excluding outliers. In some implementations, decoded or derived sample value range(s) (or thresholds) can be applied to remove outliers. The range can be referred to as an outlier threshold range. Samples whose values are not within the range can be removed, and the least square solution is calculated based on the samples whose values are within the range. In one illustrative example, 8-bit pixel values can be used, in which case a pixel value can be from 0-255. In some cases, the values of pixels in a given picture can include a subset of all the available values, such as a subset of pixel values between 16-235. The subset of values used in a given picture can be used as the range for excluding outliers. Any sample value that is outside of the range can be determined to be an outlier, and can be removed from the template before deriving the LIC parameters using the equations above. In another illustrative example, a mean value of the sample values in the template can be computed, and the range can include x-standard deviations from the mean. The x term can be set to any suitable value, such as 3 (for 3 standard deviations), 4, 5, or other suitable value. Any sample beyond the x-standard deviations from the mean can be excluded. The range can be signaled to decoder, such as at the slice level, picture level, block level, or the like.

In some examples, only the luma component needs to be used to jointly optimize the LIC parameters for both Ref0 and Ref1. Alternatively, both luma and chroma components can be considered during the derivation of the bi-predictive LIC parameters. The encoder can signal to the decoder (in a parameter set, in an SEI message, or other suitable signaling mechanism) whether or not to apply LIC to one or more of the chroma components, or only to apply LIC to the luma components.

In some cases, when FRUC bilateral matching is enabled, the bi-predictive LIC derivation can be skipped and the system can proceed with uni-directional LIC. In some cases, FRUC and bi-lateral (template based) LIC can be used together.

In some examples, the Overlapped Block Motion Compensation (OBMC) technique previously described can be used disjoint when LIC (e.g., either bi-predictive and/or uni-predictive LIC) is enabled. For example, in some cases, when LIC is enabled for a block, OBMC is disabled for the block. In another example, when LIC is enabled, OBMC is disabled for B-type slices only. In such examples, the OBMC flag and the IC flag (e.g., in the syntax of a parameter set, in a header, in an SEI message, or the like) can be enabled together only for the blocks in P-type slice. In another example, when LIC is enabled, OBMC is disabled only for bi-predicted blocks. In such examples, the OBMC and IC techniques can simultaneously be applied only for uni-predicted blocks.

Additionally, if a flag is used (e.g., in the syntax of a parameter set, in a header, in an SEI message, or the like) to indicate whether OBMC is applied or not, the associated OBMC flag should not be sent when OBMC and LIC cannot be enabled together for a block, a slice, a picture, or the like. Similarly, the constraint can be applied to the LIC flag in case of an OBMC flag being firstly signaled.

Figure 15:
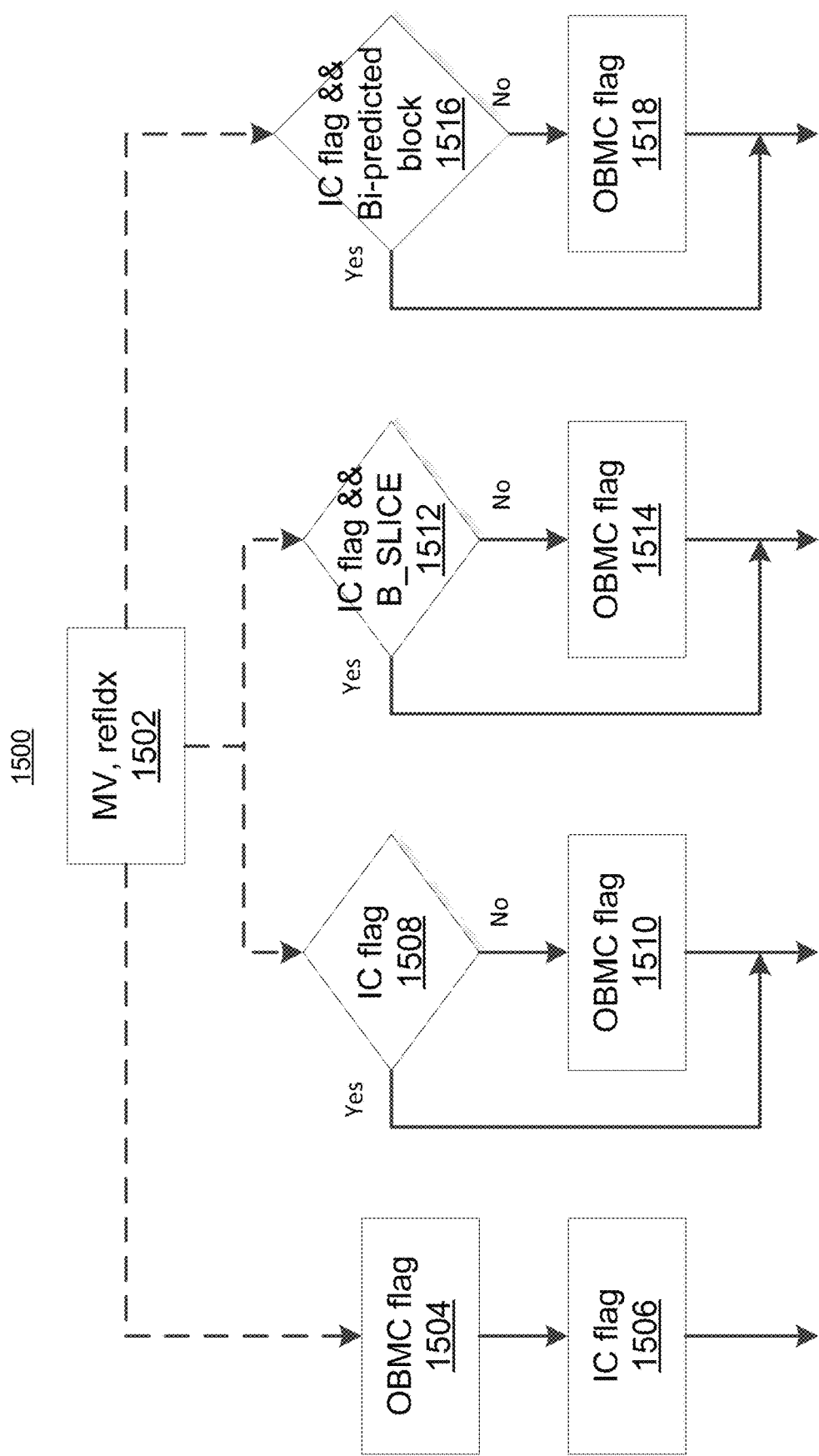
FIG. 15 is a flowchart illustrating an example of a process for improved signaling between an OBMC flag and an illumination compensation (IC) flag, in accordance with some examples.

FIG. 15 illustrates a process 1500 for the existing signaling between the IC and the OBMC flags (blocks 1504 and 1506), as well as the flow charts on the improved signaling (blocks 1502 and 1508-1518). It is proposed that using example 1, example 2, or example 3 above can achieve lower encoding complexity and better coding efficiency than existing techniques. For example, at block 1502, the process 1500 signals the motion vector and reference index for a current block. Using existing techniques, the OBMC flag (at block 1504) and the IC flag (at block 15060 are signaled. However, in example 1, the process 1500 checks whether the IC flag is signaled at block 1508. If the IC flag is signaled, the OBMC flag is not signaled. However, if the IC flag is not signaled, the OBMC flag is signaled at block 1510. When the OBMC flag is not signaled, it is assumed to be disabled for the current block.

In example 2, the process 1500, at block 1512, checks both whether the IC flag is signaled and whether the current slice is a B-type slice. If the IC flag is signaled and the current slice is a B-type slice, the OBMC flag is not signaled. However, if the IC flag is not signaled or the current slice is a B-type slice, the OBMC flag is signaled at block 1514. When the OBMC flag is not signaled, it is assumed to be disabled for the current block.

In example 3, the process 1500, at block 1516, checks both whether the IC flag is signaled and whether the current block is a bi-predicted block. If the IC flag is signaled and the current block is a bi-predicted block, the OBMC flag is not signaled. However, if the IC flag is not signaled or the current block is a bi-predicted block, the OBMC flag is signaled at block 1518. When the OBMC flag is not signaled, it is assumed to be disabled for the current block.

One or more of the above-described examples provide an alternative method to the existing Local Illumination Compensation (LIC) tool in JEM 3.0. In some of the examples, a linear least-square method is used to solve the LIC parameters for both L0 and L1 jointly in bi-predictive motion compensation. Tested on JEM-3.0 under the common test condition, the proposed method may provide 0.18%/0.01%/xxx % BD-rate reduction for random access, low-delay B, and low-delay P configurations, respectively, with 2-3% encoding time increase.

Experiments have shown positive results using the template-based bi-predictive LIC derivation techniques described herein. In the following simulation, the value of lambda is chosen to be:

$$\left(\sum_{i=0}^{N-1} P_{0,i} + \sum_{i=0}^{N-1} P_{1,i} + 64\right) >> 7 \qquad \text{Equation (12)}$$

TABLE 1

Random Access Main 10 Over JEM-3.0

|  | Y | U | V | EncT | DecT |
| --- | --- | --- | --- | --- | --- |
| Class A1 | −0.27% | 0.63% | −0.36% | 101% | 102% |
| Class A2 | −0.10% | −0.06% | −0.14% | 102% | 101% |
| Class B | −0.13% | 0.12% | 0.21% | 102% | 101% |
| Class C | −0.20% | −0.04% | 0.02% | 102% | 102% |
| Class D | −0.19% | −0.26% | −0.23% | 102% | 101% |
| Class E |  |  |  |  |  |
| Overall (Ref) | −0.18% | 0.08% | −0.09% | 102% | 101% |
| Class F (optional) | −0.73% | −0.27% | −0.16% | 98% | 99% |

TABLE 2

Low delay B Main10 Over JEM-3.0

|  | Y | U | V | EncT | DecT |
| --- | --- | --- | --- | --- | --- |
| Class A1 |  |  |  |  |  |
| Class A2 |  |  |  |  |  |
| Class B | 0.05% | −0.01% | 0.19% | 102% | 103% |
| Class C | −0.02% | −0.46% | −0.75% | 103% | 102% |
| Class D | −0.11% | −0.29% | −0.88% | 103% | 103% |
| Class E | 0.06% | −0.24% | 0.08% | 100% | 99% |
| Overall (Ref) | −0.01% | −0.24% | −0.33% | 102% | 102% |
| Class F (optional) | −1.04% | −0.78% | −0.89% | 97% | 101% |

TABLE 3

Low delay P Main10 Over JEM-3.0

|  | Y | U | V | EncT | DecT |
| --- | --- | --- | --- | --- | --- |
| Class A1 |  |  |  |  |  |
| Class A2 |  |  |  |  |  |
| Class B | #VALUE! | #VALUE! | #VALUE! | #NUM! | #NUM! |
| Class C | −0.18% | −0.18% | −0.02% | 105% | 114% |
| Class D | −0.07% | −0.20% | 0.20% | 104% | 107% |
| Class E | −0.04% | −0.14% | 0.37% | 97% | 97% |
| Overall (Ref) | #VALUE! | #VALUE! | #VALUE! | #NUM! | #NUM! |
| Class F (optional) | −0.14% | −0.15% | 0.00% | 104% | 106% |

The numbers in the first three columns of Tables 1, 2, and 3 are so-called BD-rate, which is a commonly used metric in video coding to measure coding efficiency. Negative numbers for the BD-rate refer to the reduction of bits to represent the video of the same quality and, hence, imply coding gain. The next two columns are the encoding runtime (EncT) and decoding runtime (DecT), respectively. Each of the rows in Tables 1-3 indicates a set of sequences of different resolutions from UHD (Class A1/Class A2), HD (Class B), WVGA (Class C), and WQVGA (Class D). Class F is a special set which includes the computer screen contents (SCC).

In some examples, during uni-predictive motion compensation and/or bi-predictive motion compensation, the LIC parameters can be derived by combining all or any subset of various techniques. In one illustrative example, the template can be created by considering all of the samples (e.g., pixels, all luminance samples, all chrominance samples, only one of the chrominance samples, a combination thereof, or other suitable sample) from the top neighbor, left neighbor, both the top neighbor and the left neighbor, or another neighboring block.

In some cases, the number of rows and/or columns of pixels (or other samples) to be included in the regression calculation (e.g., for either uni-predictive motion compensation or for bi-predictive motion compensation) can be one, two, or four. Other suitable numbers of rows and/or columns can also be used. In some cases, the number of possible rows and/or columns can be fixed.

In some cases, systems and methods are described herein for adaptively determining the size of one or more templates to use for LIC. For example, the number of rows and/or column of samples (e.g., pixels or other samples) in a template (e.g., $N_i$, P0, or P1 described above, or a template of a single reference picture used in uni-predictive motion compensation) used to perform LIC for a current block can vary depending on a parameter of the current block. The parameter can include the block size of the current block (e.g., the width, the height, or the width and height of the block), a chroma format of the current block (e.g., 4:2:0 format, 4:2:2 format, 4:4:4 format, or other suitable chroma format), or other parameter that can be used to determine the template size.

For example, the number of rows and/or columns of pixels (or other samples) in a template can vary depending on the width and/or height of the current block. In some examples, when the block width is less than a threshold width, the number of rows of the top template is one. In some examples, when the block height is less than a threshold height, the number of columns of the left template is one. When the block width is more than the threshold width, the number of rows of the top template is more than one, and when the block height is greater than a threshold height, the number of columns of the left template is more than one. In one illustrative example, for block with a width and/or height of less than 8 pixels, the number of lines and/or columns is limited to one. Otherwise, if the width and/or height is less than 32 pixels, the number of lines and/or columns is limited to two. Otherwise, the number of lines and/or columns can be up to 4. In some cases, the thresholds can be statically decided by the encoder and/or decoder. In some cases, the thresholds or be signaled in the Sequence Parameter Set (SPS), in the Picture Parameter Set (PPS), in the slice header, in an SEI message, or using other suitable signaling.

In another example, the number of rows and/or columns of pixels (or other samples) for chroma is dependent on a chroma format. For example, for a 4:2:0 format, the number of rows and/or columns of pixels for chroma is set to half of the luma size. In another example, for 4:2:2 format, the number of columns of pixels for chroma is set to half of the luma size while the number of rows is set to the same of the luma size. When the number of rows and/or columns of the associated luma component is one, then the associated number of rows and/or columns can be set to one.

In some examples, the size of the template can be signaled in the SPS, in the PPS, in the slice header, in an SEI message, or using other suitable signaling. In some examples, the type of interpolation filters to pre-process the neighboring pixels prior to the regression calculation include bi-linear and the 8-tap interpolation filter defined in the HEVC standard, as described herein. In some cases, to type of interpolation filters can be signaled via the SPS, the PPS, the slice header, an SEI message, or using other suitable signaling.

In some examples, one or more systems and methods are also provided for adaptive selection of weights from a pre-defined set of weights. For example, a template-based solution can be used to search for one more optimal weights out of the pre-defined set of weights without having to signal the choice of weights to the decoder. The adaptive weight selection can be used for any matching based motion prediction or compensation that utilizes weights in the prediction process. For example, the adaptive weight selection can be used for any bi-predicted block where two motion vectors pointing to two logically separate pictures are considered. In such examples, the weights can be referred to as a pair of weighting factors for both reference pictures (e.g., ref0 and ref1) with a sum equal to one. In various examples, the adaptive weight selection can be used for any template matching based motion prediction or compensation, such as LIC, weighted prediction (WP), or other prediction or compensation techniques that utilize weights in the prediction process.

For example, if a pre-defined set of weights are considered during the bi-predictive motion compensation, a template-based method can be utilized to search for the optimal set of weights without having to signal the choice of weights to the decoder. Note that this method can be applied to both LIC-enabled and LIC-disabled cases, and hence can be applied independently from some or all of the other methods described herein. Such methods and the examples below can be applied to bi-predicted blocks and/or uni-predicted blocks.

In some cases, the neighboring samples of the current block can be used as the template, similarly as that previously described. In some cases, one or more metrics associated with samples for a candidate template can be used to determine which weights from the pre-defined set of weights to select. For instance, the sum of absolute differences (SAD), the sum of absolute transformed differences (SATD), and/or the sum of squared errors (SSE) of the neighboring samples of the current block and their corresponding samples of one or more reference blocks (indicated by the motion information of the current block) can be used as criteria of template matching. In such an example, the weights from the pre-defined set of weights that result in the smallest SAD, SATD, or SSE of template matching can be selected and used to generate the prediction. One of ordinary skill will appreciate that any other measurement can be used as criteria of template matching. In such cases, signaling of one or more specific weighting parameters is not needed.

In some examples, the metrics (e.g., SAD, SATD, SSE, or the like) of template matching in the pre-defined set can be used for the signaling of the weighting parameter. For example, the order of the SAD/SATD/SSEs of template matching can be used to switch the signaling order of the weighting parameters. In one illustrative example, there are four pairs of weights and the encoder needs to signal which pair of weights to be used. The pair resulting in the lowest SAD/SATD/SSE value is assigned the codeword of "0", and the pair resulting in the second lowest SAD/SATD/SSE value is assigned the codeword of "10". The remaining two pairs are assigned the codeword of "110" and "111", respectively.

Figure 16:
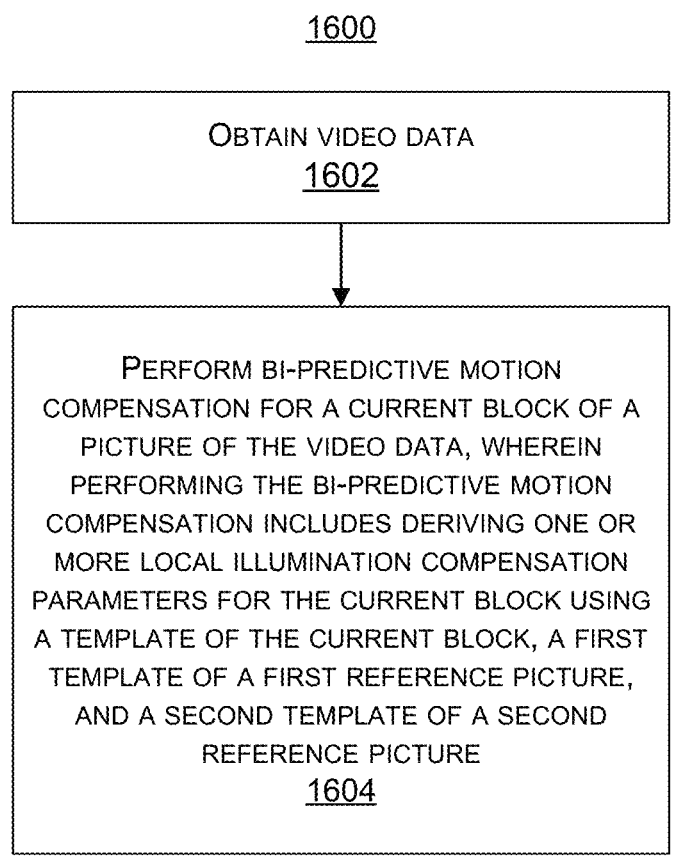
FIG. 16 is a flowchart illustrating an example of a process of processing video data, in accordance with some embodiments.

FIG. 16 is a flowchart illustrating an example of a process 1600 of processing video data using one or more of the bi-predictive LIC parameter derivation techniques described herein. At 1602, the process 1600 includes obtaining the video data. In some examples, the video data can include encoded video data (e.g., an encoded video bitstream), such as when the process 1800 is performed by a decoding device. In some examples, the video data can include un-encoded video data, such as when the process 1800 is performed by an encoding device. The video data can include a plurality of pictures, and the pictures can be divided into a plurality of blocks, as previously described. The video data can also include motion information for the pictures and/or blocks, which can be used to perform motion compensation.

At 1604, the process 1600 includes performing bi-predictive motion compensation for a current block of a picture of the video data. Performing the bi-predictive motion compensation includes deriving one or more local illumination compensation parameters for the current block using a template of the current block, a first template of a first reference picture, and a second template of a second reference picture. In one illustrative example, the current block can be the current block 1402 shown in FIG. 14, the template of the current block can include the template $N_T$, the first reference picture can include the reference block 1404, the first template can include the template P0, the second reference picture can include the reference block 1406, and the second template can include the template P1.

In some examples, the first template of the first reference picture and the second template of the second reference picture are used simultaneously to derive the one or more local illumination compensation parameters. For example, the cost function shown in equation (4) or the cost function shown in equation (10) (or other suitable function) can be solved to derive the one or more local illumination compensation parameters using bo the first reference picture and the second reference picture at the same time (both reference pictures are used in the same cost function).

In some cases, the template of the current block includes one or more spatially neighboring samples of the current block. For instance, using FIG. 14 as an example, the template $N_i$ is made up of samples from a block that is neighboring the current block 1402. In such cases, the first template includes one or more spatially neighboring samples of the first reference block, and the second template includes one or more spatially neighboring samples of the second reference block. For instance, again using FIG. 14 as an example, the template P0 includes spatially neighboring samples of the reference block 1404, and the template P1 includes spatially neighboring samples of the reference block 1406.

In some examples, the one or more local illumination compensation parameters for the current block can be derived by obtaining the one or more spatially neighboring samples of the template of the current block. The process 1600 can determine one or more samples of the first template of the first reference picture. The one or more samples of the first template include one or more spatially neighboring samples of a first reference block of the first reference picture. The process 1600 can also determine one or more samples of the second template of the second reference picture, which include one or more spatially neighboring samples of a second reference block of the second reference picture. For example, motion information (e.g., motion vectors and two reference indexes) of the current block can be used to locate first and second reference pictures (using the reference indexes) and the first and second blocks within the reference pictures (using the motion vectors). The one or more spatially neighboring samples of the first and second reference blocks can then be determined. In one illustrative example, the one or more spatially neighboring samples of the first reference block contained in the first template can be determined as the one or more rows of samples from the neighboring block above the first reference block and the one or more columns of samples from the neighboring block to the left of the first reference block. In such an example, the one or more spatially neighboring samples of the second reference block contained in the second template can be determined as the one or more rows of samples from the neighboring block above the second reference block and the one or more columns of samples from the neighboring block to the left of the second reference block. Rows and/or columns from other neighboring blocks can also be used.

The one or more illumination compensation parameters can be derived for the current block based on the one or more spatially neighboring samples of the current block, the one or more samples of the first template, and the one or more samples of the second template. For example, the one or more local illumination compensation parameters can be derived by solving a cost function using the offset, the first weight, and the second weight. In one illustrative example, the cost function shown in equation (4) or the cost function shown in equation (10) (or other suitable function) can be solved using the one or more spatially neighboring samples of the current block, the one or more samples of the first template, and the one or more samples of the second template to derive the one or more local illumination compensation parameters for the current block. In such an example, the inputs to the LIC procedure include the neighboring samples of the current block, the neighboring samples of the two reference blocks, as well as the two motion vectors and reference indexes, which indicates where the reference samples come from.

In some cases, the template of the current block includes a subset of a plurality of samples of at least one neighboring block of the current block. For instance, the template of the current block can include a single line of pixels from a neighboring block, or multiple lines of pixels from a neighboring block. In one example, the neighboring samples making up the template can be from a top neighboring block, a left neighboring block, both the top neighboring block and the left neighboring block, or other neighboring block. In an example in which the template of the current block includes a top neighboring block and a left neighboring block of the current block, the template can include a single row from the top neighboring block and a single column of the left neighboring block. In some examples, the template of the current block includes multiple lines of samples from a neighboring block of the current block. In some cases, the template of the current block includes multiple lines of samples from a first neighboring block and multiple lines of samples from a second neighboring block of the current block. In some cases, the template can include neighboring samples from more than two neighboring blocks. In an example in which the template of the current block includes a top neighboring block and a left neighboring block of the current block, the template can include two or more rows from the top neighboring block and two or more columns of the left neighboring block. The first template of the first reference block and the second template of the second reference block can also include a single row and/or column of neighboring blocks of the respective reference blocks, or multiple rows and/or columns from the neighboring blocks.

In some examples, the one or more local illumination compensation parameters include one or more weights. For instance, the one or more weights can include a first weight corresponding to the first reference picture and a second weight corresponding to the second reference picture. Using the previous examples, the first weight can include the weight $w_0$ and the second weight can include the weight $w_1$ from equation (4) or equation (10). In some examples, the one or more local illumination compensation parameters include an offset. Using the examples from above, the offset can include the offset o from equation (4) or equation (10). In some cases, the one or more local illumination compensation parameters include an offset, a first weight corresponding to the first reference picture, and a second weight corresponding to the second reference picture.

In some implementations, integer-positioned samples in the first template of the first reference picture and integer-positioned samples in the second template of the second reference picture are used for deriving the one or more local illumination compensation parameters. In some cases, fractional-positioned samples in the first template of the first reference picture and fractional-positioned samples in the second template of the second reference picture are used for deriving the one or more local illumination compensation parameters. In such cases, the process 1600 can use at least one interpolation filter to derive the fractional-positioned samples in the first template of the first reference picture and the fractional-positioned samples in the second template.

In some examples, certain samples from the neighboring samples of the first and second reference blocks can be excluded from use in deriving the one or more illumination compensation parameters. For instance, the process 1600 can include determining at least one sample from at least one or more of the first template or the second template that are outside of an outlier threshold range, and excluding the at least one sample from being used to derive the one or more local illumination compensation parameters. For example, as described previously, the outlier threshold range can include a subset of all the available pixel values in the template, an x-standard deviations from the mean of pixel values in the template, or other suitable range.

In some cases, only luma components from one or more samples of the first template and the second template are used to derive the one or more local illumination compensation parameters. In some cases, luma components and at least one chroma component from one or more samples of the first template and the second template are used to derive the one or more local illumination compensation parameters.

When performed by a decoder, the process 1600 can further include decoding the current block using the one or more illumination compensation parameters. When performed by an encoder or other transmitter-side device, the process 1600 can include signaling the one or more illumination compensation parameters in an encoded video bitstream.

In some examples, Overlapped Block Motion Compensation (OBMC) can be disabled for the current block when local illumination compensation is enabled for the current block. In some cases, OBMC is disabled for B-type slices of the video data when local illumination compensation is enabled for the video data. In some cases, OBMC is disabled for bi-predicted blocks of the video data when local illumination compensation is enabled for the video data.

Figure 17:
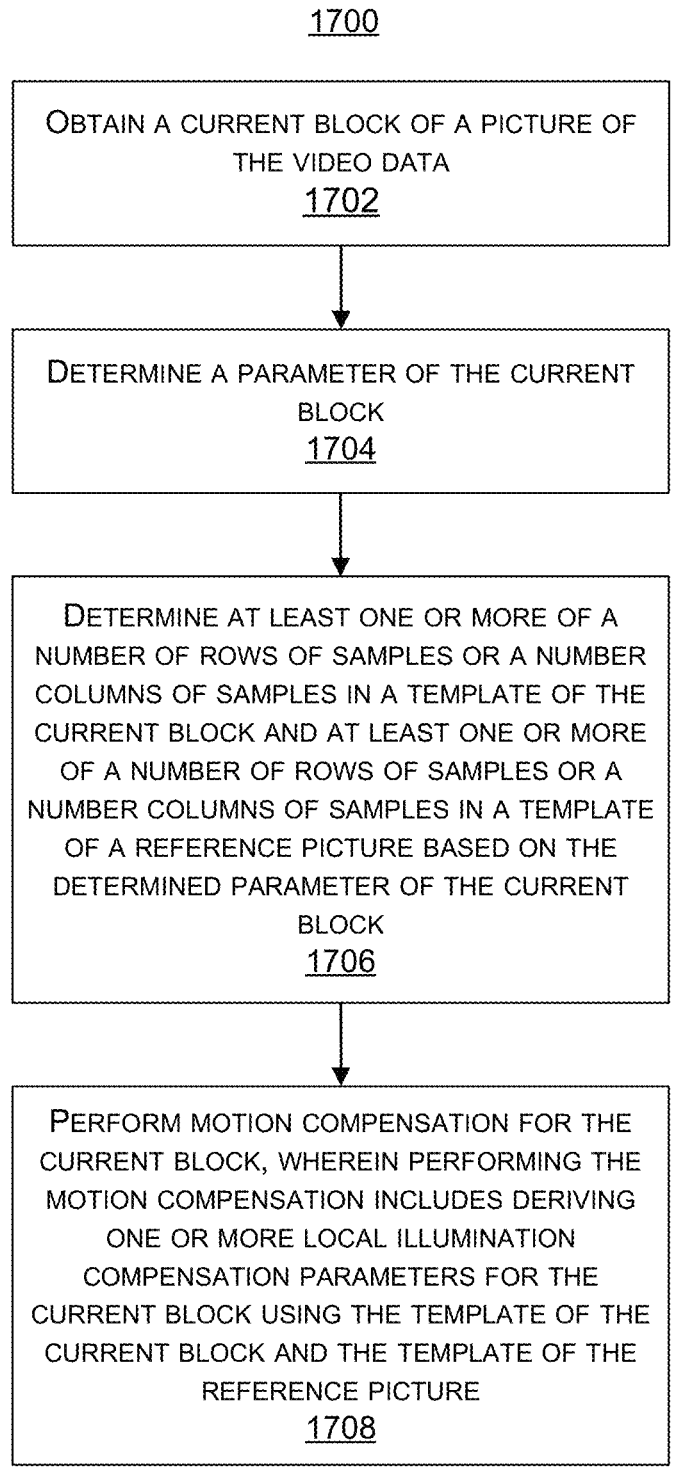
FIG. 17 is a flowchart illustrating another example of a process of processing video data, in accordance with some embodiments.

FIG. 17 is a flowchart illustrating an example of a process 1700 of processing video data using one or more of the adaptive template derivation techniques described herein. At 1702, the process 1700 includes obtaining a current block of a picture of the video data. In some examples, the video data can include encoded video data (e.g., an encoded video bitstream), such as when the process 1800 is performed by a decoding device. In some examples, the video data can include un-encoded video data, such as when the process 1800 is performed by an encoding device. The video data can include a plurality of pictures, and the pictures can be divided into a plurality of blocks, as previously described. The video data can also include motion information for the pictures and/or blocks, which can be used to perform motion compensation.

At 1704, the process 1700 includes determining a parameter of the current block. In some cases, the parameter of the current block includes a size of the current block. In one illustrative example, the size of the current block can include a width of the current block. In another example, the size of the current block includes a height of the current block. In another example, the size of the current block includes a width of the block and a height of the block. The size can also include any other suitable measure of size, such as number of pixels, area, or the like. In some cases, the parameter of the current block includes a chroma format of the current block. In various examples, the chroma format can include a 4:2:0 chroma format, a 4:2:2 chroma format, a 4:4:4 chroma format, or other suitable format.

At 1706, the process 1700 includes determining at least one or more of a number of rows of samples or a number columns of samples in a template of the current block and at least one or more of a number of rows of samples or a number columns of samples in a template of a reference picture based on the determined parameter of the current block. In one illustrative example, when the parameter includes a width of the block, the number of rows of samples in the template of the current block is one row when the width of the current block is less than a threshold width. In another illustrative example, when the parameter includes a width of the block, the number of rows of samples in the template of the current block is more than one row when the width of the current block is greater than a threshold width. In another illustrative example, when the parameter includes a height of the block, the number of columns of samples in the template of the current block is one column when the height of the current block is less than a threshold height. In another illustrative example, when the parameter includes a height of the block, the number of columns of samples in the template of the current block is more than one columns when the height of the current block is greater than a threshold height. In another illustrative example, when the parameter includes a chroma format of the block, the number of rows of samples and the number of columns of samples in the template of the current block is set to half of a luma size of the current block when the chroma format of the current block is 4:2:0. In another illustrative example, when the parameter includes a chroma format of the block, the number of rows of samples in the template of the current block is set to a same size as a luma size of the current block and wherein the number of columns of samples in the template of the current block is set to half of the luma size when the chroma format of the current block is 4:2:2.

At 1708, the process 1700 includes performing motion compensation for the current block. Performing the motion compensation includes deriving one or more local illumination compensation parameters for the current block using the template of the current block and the template of the reference picture. The motion compensation can include uni-predictive motion compensation or bi-predictive motion compensation.

When performed by a decoder, the process 1700 can further include decoding the current block using the one or more illumination compensation parameters. When performed by an encoder or other transmitter-side device, the process 1700 can include signaling the one or more illumination compensation parameters in an encoded video bitstream.

Figure 18:
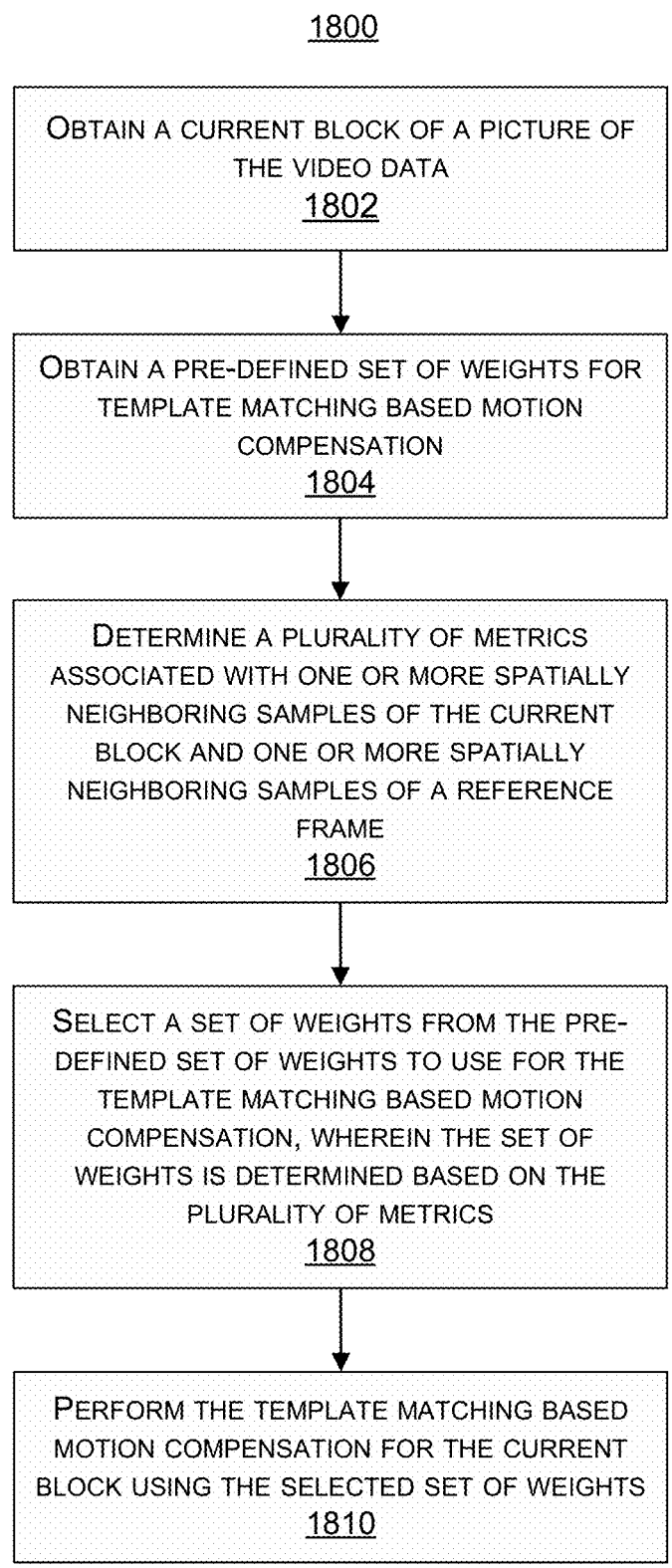
FIG. 18 is a flowchart illustrating another example of a process of processing video data, in accordance with some embodiments.

FIG. 18 is a flowchart illustrating an example of a process 1800 of processing video data using one or more of the adaptive weight selection techniques described herein. At 1802, the process 1800 includes obtaining a current block of a picture of the video data. In some examples, the video data can include encoded video data (e.g., an encoded video bitstream), such as when the process 1800 is performed by a decoding device. In some examples, the video data can include un-encoded video data, such as when the process 1800 is performed by an encoding device. The video data can include a plurality of pictures, and the pictures can be divided into a plurality of blocks, as previously described. The video data can also include motion information for the pictures and/or blocks, which can be used to perform motion compensation.

At 1804, the process 1800 includes obtaining a pre-defined set of weights for template matching based motion compensation. In some cases, the predefined set of weights includes at least a first set of weights and a second set of weights. The predefined set of weights can include more sets of weights than the first and second sets of weights. The weights can be used in any suitable motion compensation or estimation function, such as local illumination compensation, weighted prediction, or other function that uses weights for video coding.

At 1806, the process 1800 includes determining a plurality of metrics associated with one or more spatially neighboring samples of the current block and one or more spatially neighboring samples of at least one reference frame. For example, the plurality of metrics can be determined by determining a first metric by applying the first set of weights to the one or more spatially neighboring samples of the at least one reference frame, and determining a second metric by applying the second set of weights to the one or more spatially neighboring samples of the at least one reference frame. In some cases, the process 1800 can apply a set of paired weights (e.g., two weights whose sum is equal to 1) from the pre-defined set of weights to the neighboring samples of two reference blocks during bi-prediction. For example, a first weight of the set of paired weights can be applied to a first reference frame, and a second weight of the set of paired weights can be applied to a second reference frame.

In some cases, the plurality of metrics can be determined by computing a sum of absolute differences between the one or more spatially neighboring samples of the current block and the one or more spatially neighboring samples of the at least one reference frame. In some cases, the plurality of metrics can be determined by computing a sum of absolute transformed differences between the one or more spatially neighboring samples of the current block and the one or more spatially neighboring samples of the at least one reference frame. In some cases, the plurality of metrics can be determined by computing a sum of squared errors of prediction between the one or more spatially neighboring samples of the current block and the one or more spatially neighboring samples of the at least one reference frame.

At 1808, the process 1800 includes selecting a set of weights from the pre-defined set of weights to use for the template matching based motion compensation. The set of weights is determined based on the plurality of metrics. For example, the set of weights can be selected based on the plurality of metrics by comparing the first metric and the second metric, determining the first metric is smaller than the second metric, and selecting the first set of weights based on the first metric being smaller than the second metric. As indicated by the first metric being smaller than the second metric, the first set of weights results in a smallest metric among the pre-defined set of weights for template matching based motion compensation.

At 1810, the process 1800 includes performing the template matching based motion compensation for the current block using the selected set of weights. The template matching based motion compensation can include any suitable motion compensation technique, such as local illumination compensation (LIC), weighted prediction (WP), or other suitable template matching based motion compensation technique.

In some cases, no weighting parameter is signaled with the video data. For instance, by adaptively selecting a set of weights, there is no need for a weighting parameter to be signaled to a decoder, since the decoder is able to select the set of weights using the process In some examples, the processes 1600, 1700, and 1800 may be performed by a computing device or an apparatus, such as the system 100 shown in FIG. 1. For example, the process 900 can be performed by the encoding device 104 shown in FIG. 1 and FIG. 12, by another video source-side device or video transmission device, by the decoding device 112 shown in FIG. 1 and FIG. 12, and/or by another client-side device, such as a player device, a display, or any other client-side device. The process 1000 can be performed by the encoding device 104 shown in FIG. 1 and FIG. 12, or by another video source-side device or video transmission device. The process 1100 can be performed by the decoding device 112 shown in FIG. 1 and FIG. 20 and/or by the encoding device 104 shown in FIG. 1 and FIG. 19. In some cases, the computing device or apparatus may include a processor, microprocessor, microcomputer, or other component of a device that is configured to carry out the steps of processes 1600, 1700, and 1800. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may further include a network interface configured to communicate the video data. The network interface may be configured to communicate Internet Protocol (IP) based data or other type of data. In some examples, the computing device or apparatus may include a display for displaying output video content, such as samples of pictures of a video bitstream.

Processes 1600, 1700, and 1800 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 1600, 1700, and 1800 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the invention have been described.

Figure 19:
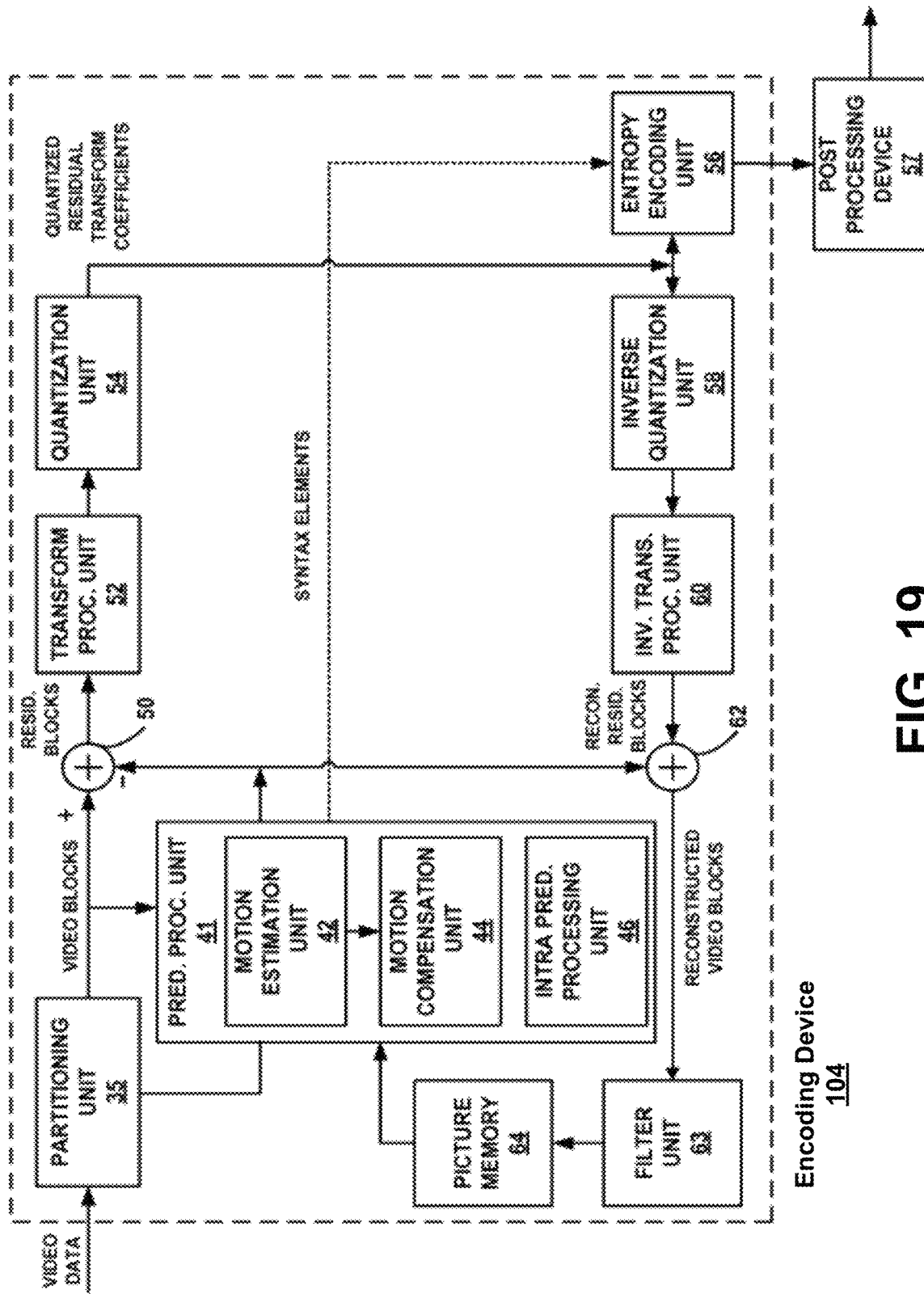
FIG. 19 is a block diagram illustrating an example video encoding device, in accordance with some examples.
Figure 20:
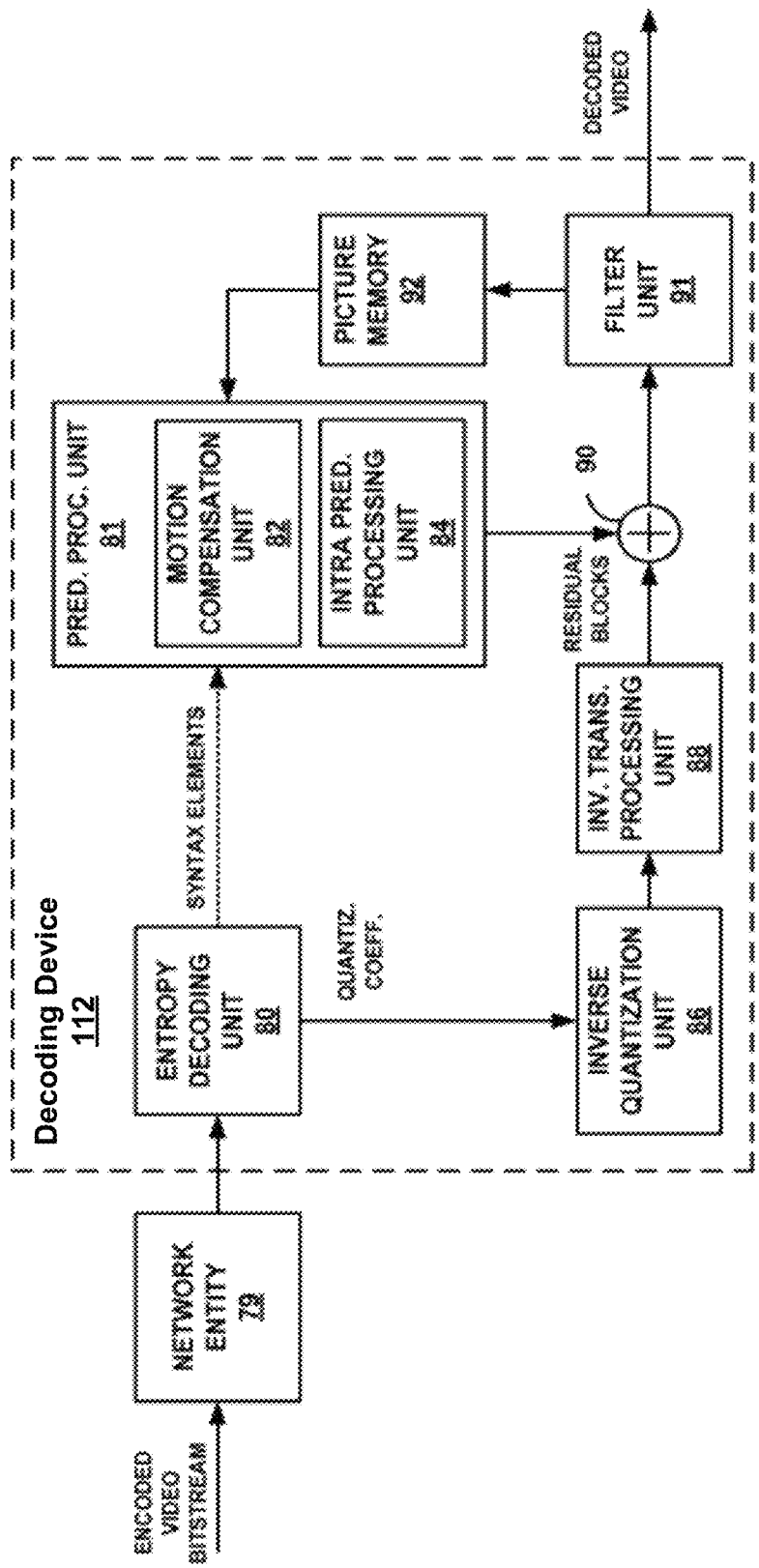
FIG. 20 is a block diagram illustrating an example video decoding device, in accordance with some examples.

Specific details of the encoding device 104 and the decoding device 112 are shown in FIG. 19 and FIG. 20, respectively. FIG. 19 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 19 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 19, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 19 represents an example of a video encoder configured to derive LIC parameters, adaptively determine sizes of templates, and/or adaptively select weights. The encoding device 104 may, for example, derive LIC parameters, adaptively determine sizes of templates, and/or adaptively select weights sets as described above. For instance, the encoding device 104 may perform any of the techniques described herein, including the processes described above with respect to FIGS. 16, 17, and 18. In some cases, some of the techniques of this disclosure may also be implemented by post processing device 57.

FIG. 20 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 20.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 17 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In this manner, the decoding device 112 of FIG. 20 represents an example of a video decoder configured to derive LIC parameters, adaptively determine sizes of templates, and/or adaptively select weights. The decoding device 112 may, for example, derive LIC parameters, adaptively determine sizes of templates, and/or adaptively select weights sets as described above. For instance, the decoding device 112 may perform any of the techniques described herein, including the processes described above with respect to FIGS. 16, 17, and 18.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of processing video data, the method comprising:

obtaining a current block of a picture of the video data;

obtaining a pre-defined set of weights including pre-defined values for template matching based motion compensation, the pre-defined set of weights comprising at least a first pair of weights and a second pair of weights;

applying a first weight of the first pair of weights of the pre-defined set of weights to one or more spatially neighboring samples of a first reference frame, the first weight of the first pair of weights having a first pre-defined value;

applying a second weight of the first pair of weights of the pre-defined set of weights to one or more spatially neighboring samples of a second reference frame, the second weight of the first pair of weights having a second pre-defined value;

based on applying the first weight of the first pair of weights to the one or more spatially neighboring samples of the first reference frame and applying the second weight of the first pair of weights to the one or more spatially neighboring samples of the second reference frame, determining a first metric associated with one or more spatially neighboring samples of the current block, the one or more spatially neighboring samples of a first reference frame, and the one or more spatially neighboring samples of a second reference frame;

applying a first weight of the second pair of weights of the pre-defined set of weights to the one or more spatially neighboring samples of the first reference frame, the first weight of the second pair of weights having a third pre-defined value;

applying a second weight of the second pair of weights of the pre-defined set of weights to the one or more spatially neighboring samples of the second reference frame, the second weight of the second pair of weights having a fourth pre-defined value;

based on applying the first weight of the second pair of weights to the one or more spatially neighboring samples of the first reference frame and applying the second weight of the second pair of weights to the one or more spatially neighboring samples of the second reference frame, determining a second metric associated with the one or more spatially neighboring samples of the current block, the one or more spatially neighboring samples of the first reference frame, and the one or more spatially neighboring samples of the second reference frame;

comparing the first metric and the second metric;

determining the first metric is smaller than the second metric;

selecting the first pair of weights as a selected pair of weights based on the first metric being smaller than the second metric; and generating a template matching based motion compensation prediction for the current block based on the selected pair of weights.

2. The method of claim 1, wherein the first metric includes a sum of absolute differences between the one or more spatially neighboring samples of the current block and the one or more spatially neighboring samples of at least the first reference frame; and wherein the second metric includes a sum of absolute differences between the one or more spatially neighboring samples of the current block and the one or more spatially neighboring samples of at least the second reference frame.

3. The method of claim 1, wherein the first metric includes a sum of absolute transformed differences between the one or more spatially neighboring samples of the current block and the one or more spatially neighboring samples of at least the first reference frame; and wherein the second metric includes a sum of absolute transformed differences between the one or more spatially neighboring samples of the current block and the one or more spatially neighboring samples of at least the second reference frame.

4. The method of claim 1, wherein the first metric includes a sum of squared errors of prediction between the one or more spatially neighboring samples of the current block and the one or more spatially neighboring samples of at least the first reference frame; and wherein the second metric includes a sum of squared errors of prediction between the one or more spatially neighboring samples of the current block and the one or more spatially neighboring samples of at least the second reference frame.

5. The method of claim 1, wherein no weighting parameter is signaled with the video data.

6. The method of claim 1, wherein the template matching based motion compensation includes local illumination compensation (LIC).

7. The method of claim 1, wherein the template matching based motion compensation includes weighted prediction (WP).

8. An apparatus comprising:
a memory configured to store video data; and
a processor configured to:
  obtain a current block of a picture of the video data;
  obtain a pre-defined set of weights including pre-defined values for template matching based motion compensation, the pre-defined set of weights comprising at least a first pair of weights and a second pair of weights;
  apply a first weight of the first pair of weights of the pre-defined set of weights to one or more spatially neighboring samples of a first reference frame, the first weight of the first pair of weights having a first pre-defined value;
  apply a second weight of the first pair of weights of the pre-defined set of weights to one or more spatially neighboring samples of a second reference frame, the second weight of the first pair of weights having a second pre-defined value;
  based on applying the first weight of the first pair of weights to the one or more spatially neighboring samples of the first reference frame and applying the second weight of the first pair of weights to the one or more spatially neighboring samples of the second reference frame, determine a first metric associated with one or more spatially neighboring samples of the current block, the one or more spatially neighboring samples of a first reference frame, and the one or more spatially neighboring samples of a second reference frame;
  apply a first weight of the second pair of weights of the pre-defined set of weights to the one or more spatially neighboring samples of the first reference frame, the first weight of the second pair of weights having a third pre-defined value;
  apply a second weight of the second pair of weights of the pre-defined set of weights to the one or more spatially neighboring samples of the second reference frame, the second weight of the second pair of weights having a fourth pre-defined value;
  based on applying the first weight of the second pair of weights to the one or more spatially neighboring samples of the first reference frame and applying the second weight of the second pair of weights to the one or more spatially neighboring samples of the second reference frame, determine a second metric associated with the one or more spatially neighboring samples of the current block, the one or more spatially neighboring samples of the first reference frame, and the one or more spatially neighboring samples of the second reference frame;
  compare the first metric and the second metric;
  determine the first metric is smaller than the second metric;
  selecting the first pair of weights as a selected pair of weights based on the first metric being smaller than the second metric; and
  generate a template matching based motion compensation prediction for the current block based on the template matching based motion compensation for the current block using the selected pair of weights.

9. The apparatus of claim 8, wherein the first metric includes a sum of absolute differences between the one or more spatially neighboring samples of the current block and the one or more spatially neighboring samples of at least the first reference frame; and wherein the second metric includes a sum of absolute differences between the one or more spatially neighboring samples of the current block and the one or more spatially neighboring samples of at least the second reference frame.

10. The apparatus of claim 8, wherein the first metric includes a sum of absolute transformed differences between the one or more spatially neighboring samples of the current block and the one or more spatially neighboring samples of at least the first reference frame; and wherein the second metric includes a sum of absolute transformed differences between the one or more spatially neighboring samples of the current block and the one or more spatially neighboring samples of at least the second reference frame.

11. The apparatus of claim 8, wherein the first metric includes a sum of squared errors of prediction between the one or more spatially neighboring samples of the current block and the one or more spatially neighboring samples of at least the first reference frame; and wherein the second metric includes a sum of squared errors of prediction between the one or more spatially neighboring samples of the current block and the one or more spatially neighboring samples of at least the second reference frame.

12. The apparatus of claim 8, wherein no weighting parameter is signaled with the video data.

13. The apparatus of claim 8, wherein the template matching based motion compensation includes local illumination compensation (LIC).

14. The apparatus of claim 8, wherein the template matching based motion compensation includes weighted prediction (WP).

15. The apparatus of claim 8, further comprising:
a display for displaying the video data.

16. The apparatus of claim 8, wherein the apparatus comprises a mobile device with a camera for capturing pictures.

17. A non-transitory computer-readable medium having stored thereon instructions that, when executed by one or more processors, cause the one or more processors to:
obtain a current block of a picture of video data;
obtain a pre-defined set of weights including pre-defined values for template matching based motion compensation, the pre-defined set of weights comprising at least a first pair of weights and a second pair of weights;
apply a first weight of the first pair of weights of the pre-defined set of weights to one or more spatially neighboring samples of a first reference frame, the first weight of the first pair of weights having a first pre-defined value;
apply a second weight of the first pair of weights of the pre-defined set of weights to one or more spatially neighboring samples of a second reference frame, the second weight of the first pair of weights having a second pre-defined value;
based on applying the first weight of the first pair of weights to the one or more spatially neighboring samples of the first reference frame and applying the second weight of the first pair of weights to the one or more spatially neighboring samples of the second reference frame, determine a first metric associated with one or more spatially neighboring samples of the current block, the one or more spatially neighboring samples of a first reference frame, and the one or more spatially neighboring samples of a second reference frame;
apply a first weight of the second pair of weights of the pre-defined set of weights to the one or more spatially neighboring samples of the first reference frame, the first weight of the second pair of weights having a third pre-defined value;
apply a second weight of the second pair of weights of the pre-defined set of weights to the one or more spatially neighboring samples of the second reference frame, the second weight of the second pair of weights having a fourth pre-defined value;
based on applying the first weight of the second pair of weights to the one or more spatially neighboring samples of the first reference frame and applying the second weight of the second pair of weights to the one or more spatially neighboring samples of the second reference frame, determine a second metric associated with the one or more spatially neighboring samples of the current block, the one or more spatially neighboring samples of the first reference frame, and the one or more spatially neighboring samples of the second reference frame;
compare the first metric and the second metric;
determine the first metric is smaller than the second metric;
select the first pair of weights as a selected pair of weights based on the first metric being smaller than the second metric; and
generate a template matching based motion compensation prediction for the current block based on the selected pair of weights.

18. The non-transitory computer-readable medium of claim 17, wherein the first metric includes a sum of absolute differences between the one or more spatially neighboring samples of the current block and the one or more spatially neighboring samples of at least the first reference frame; and
wherein the second metric includes a sum of absolute differences between the one or more spatially neighboring samples of the current block and the one or more spatially neighboring samples of at least the second reference frame.

19. The non-transitory computer-readable medium of claim 17, wherein the first metric includes a sum of absolute transformed differences between the one or more spatially neighboring samples of the current block and the one or more spatially neighboring samples of at least the first reference frame; and
wherein the second metric includes a sum of absolute transformed differences between the one or more spatially neighboring samples of the current block and the one or more spatially neighboring samples of at least the second reference frame.

20. The non-transitory computer-readable medium of claim 17, wherein the first metric includes a sum of squared errors of prediction between the one or more spatially neighboring samples of the current block and the one or more spatially neighboring samples of at least the first reference frame; and
wherein the second metric includes a sum of squared errors of prediction between the one or more spatially neighboring samples of the current block and the one or more spatially neighboring samples of at least the second reference frame.

21. The non-transitory computer-readable medium of claim 17, wherein no weighting parameter is signaled with the video data.

22. The non-transitory computer-readable medium of claim 17, wherein the template matching based motion compensation includes local illumination compensation (LIC).

23. The non-transitory computer-readable medium of claim 17, wherein the template matching based motion compensation includes weighted prediction (WP).

24. An apparatus for processing video data, comprising:
means for obtaining a current block of a picture of the video data;
means for obtaining a pre-defined set of weights including pre-defined values for template matching based motion compensation, the pre-defined set of weights comprising at least a first pair of weights and a second pair of weights;
means for applying a first weight of the first pair of weights of the pre-defined set of weights to one or more spatially neighboring samples of a first reference frame, the first weight of the first pair of weights having a first pre-defined value;
means for applying a second weight of the first pair of weights of the pre-defined set of weights to one or more spatially neighboring samples of a second reference frame, the second weight of the first pair of weights having a second pre-defined value;

means for determining, based on applying the first weight of the first pair of weights to the one or more spatially neighboring samples of the first reference frame and applying the second weight of the first pair of weights to the one or more spatially neighboring samples of the second reference frame, a first metric associated with one or more spatially neighboring samples of the current block, the one or more spatially neighboring samples of a first reference frame, and the one or more spatially neighboring samples of a second reference frame;

means for applying a first weight of the second pair of weights of the pre-defined set of weights to the one or more spatially neighboring samples of the first reference frame, the first weight of the second pair of weights having a third pre-defined value;

means for applying a second weight of the second pair of weights of the pre-defined set of weights to the one or more spatially neighboring samples of the second reference frame, the second weight of the second pair of weights having a fourth pre-defined value;

means for determining, based on applying the first weight of the second pair of weights to the one or more spatially neighboring samples of the first reference frame and applying the second weight of the second pair of weights to the one or more spatially neighboring samples of the second reference frame, a second metric associated with the one or more spatially neighboring samples of the current block, the one or more spatially neighboring samples of the first reference frame, and the one or more spatially neighboring samples of the second reference frame;

means for comparing the first metric and the second metric;

means for determining the first metric is smaller than the second metric;

means for selecting the first pair of weights as a selected pair of weights based on the first metric being smaller than the second metric; and means for generating a template matching based motion compensation prediction for the current block based on the selected pair of weights the template matching based motion compensation for the current block using the selected pair of weights.

* * * * *